Figure 1:
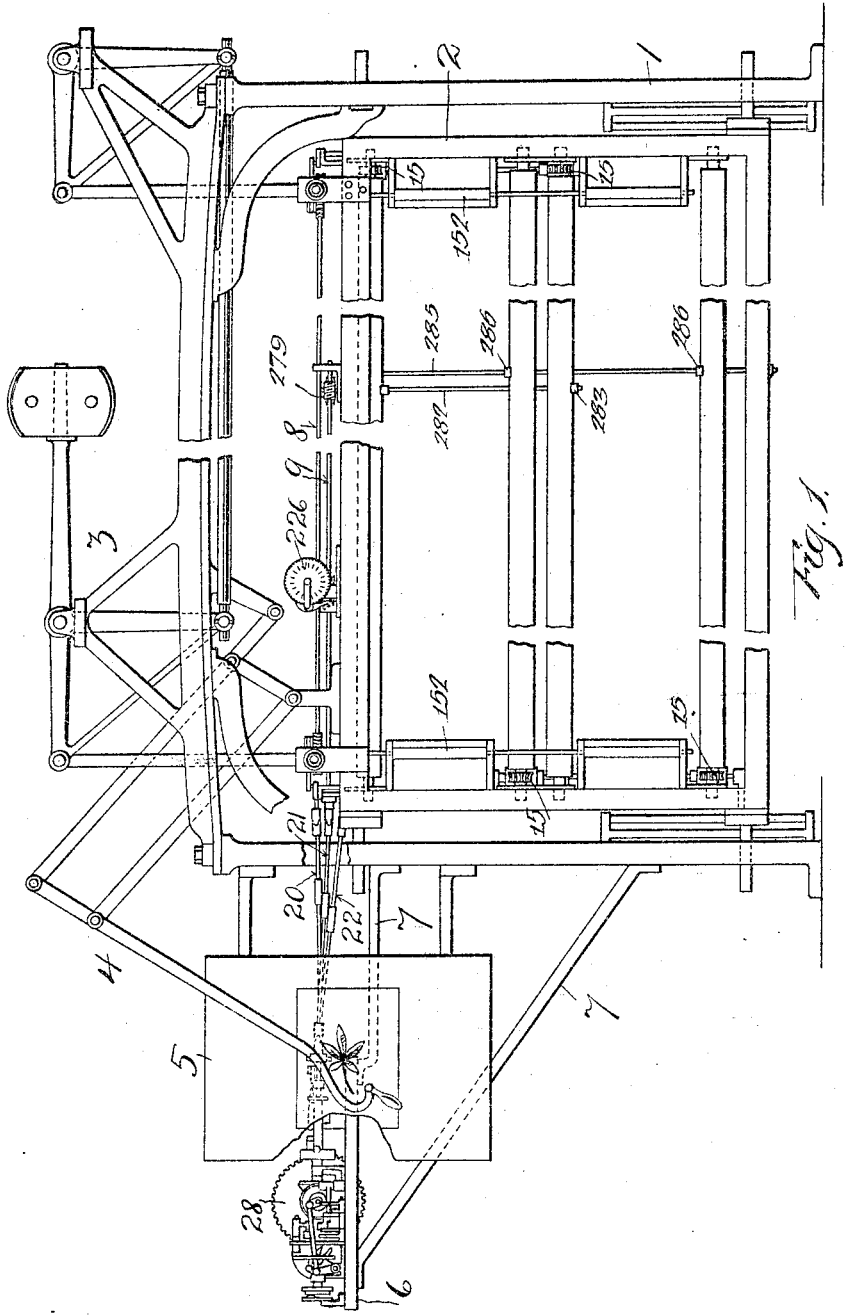

J. A. GROEBLI.
FABRIC SHIFTING AND TENSIONING MECHANISM FOR EMBROIDERING MACHINES.
APPLICATION FILED JAN. 10, 1914.

1,210,793.

Patented Jan. 2, 1917.
13 SHEETS—SHEET 1.

Witnesses:
A. L. Dollard
R. Rotheran

Inventor:
Joseph A. Groebli
by Charles G. Hensley
Attorney.

J. A. GROEBLI.
FABRIC SHIFTING AND TENSIONING MECHANISM FOR EMBROIDERING MACHINES.
APPLICATION FILED JAN. 10, 1914.
1,210,793.
Patented Jan. 2, 1917.
13 SHEETS—SHEET 2.
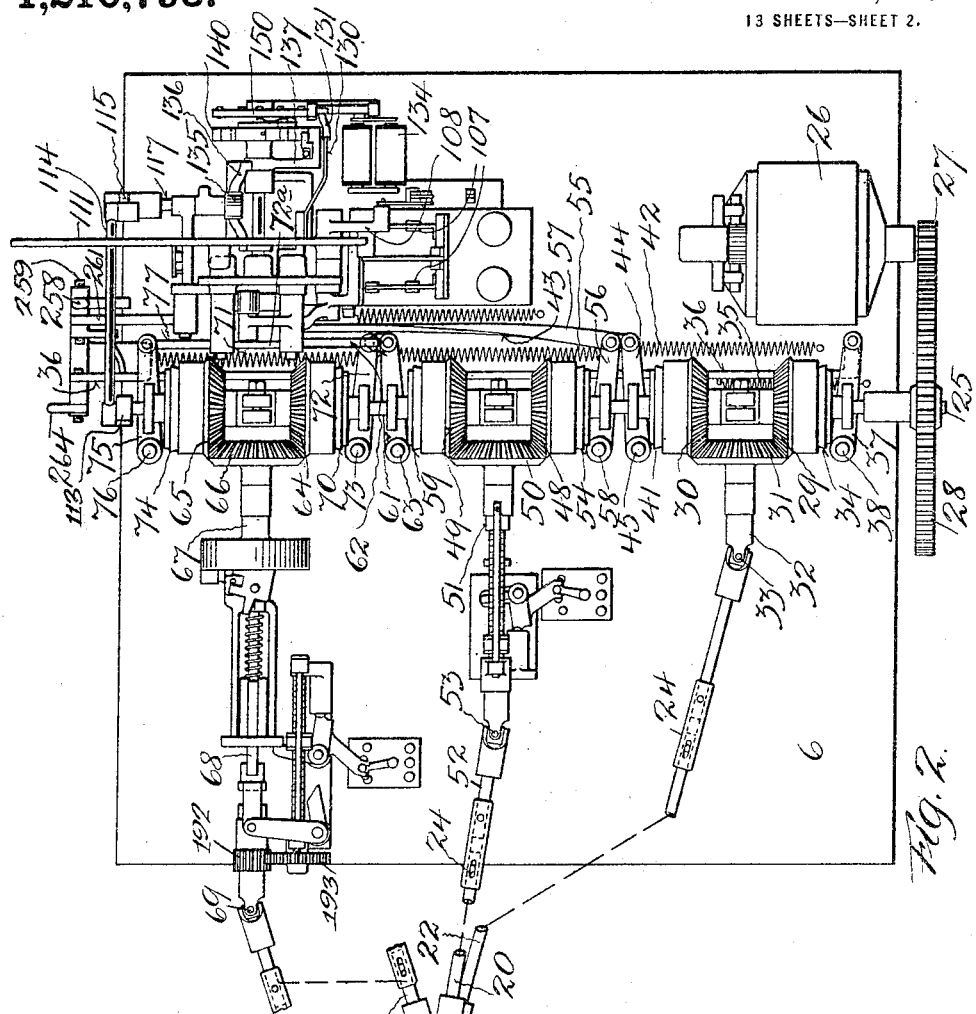
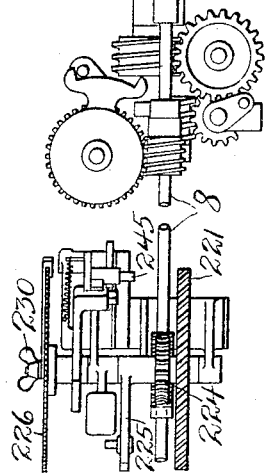
Witnesses:
G. B. Dollard
R. Rotheroem
Inventor:
Joseph A. Groebli
by Charles G. Hensley
Attorney.

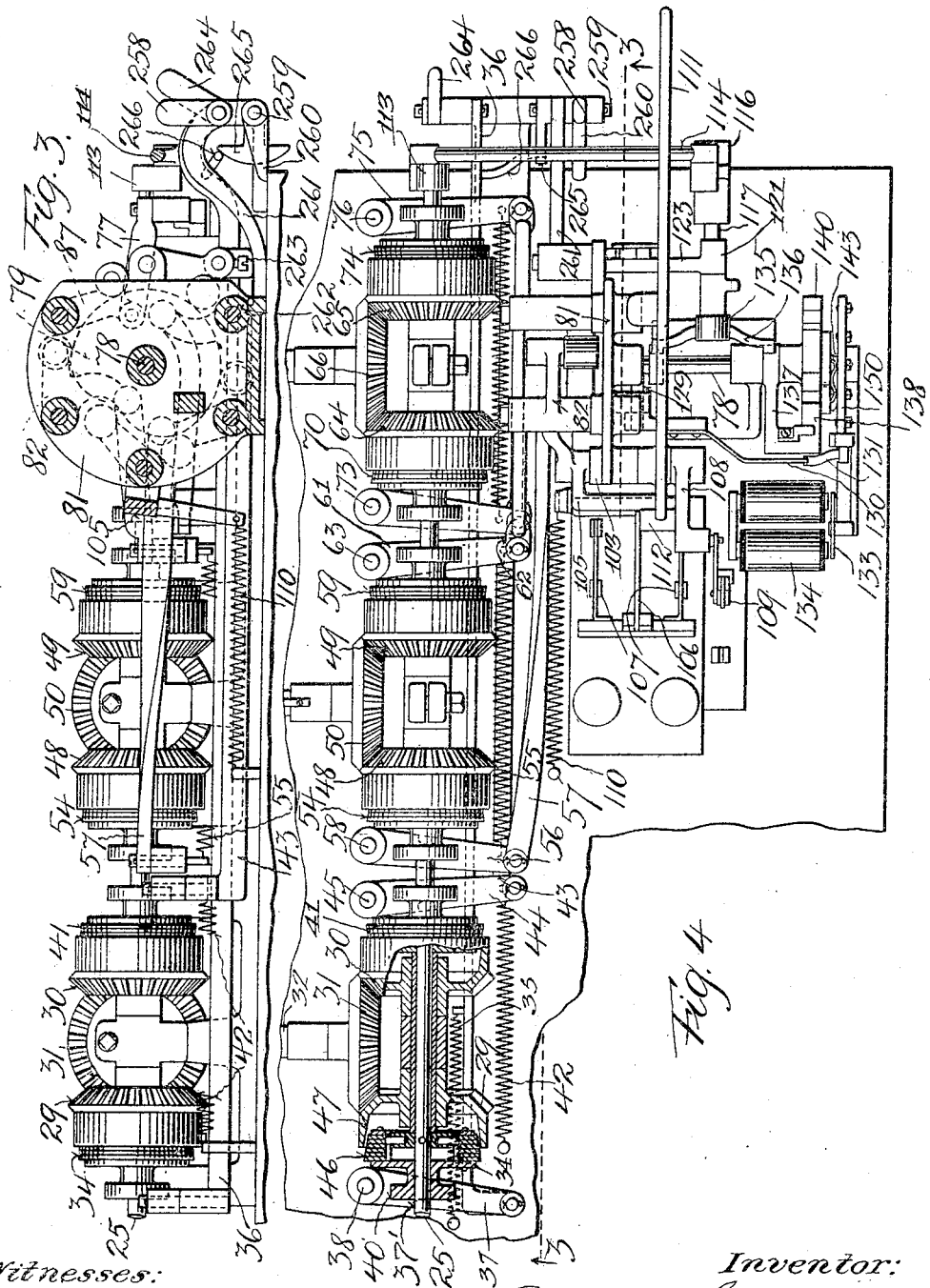

J. A. GROEBLI.
FABRIC SHIFTING AND TENSIONING MECHANISM FOR EMBROIDERING MACHINES.
APPLICATION FILED JAN. 10, 1914.

1,210,793.

Patented Jan. 2, 1917.
13 SHEETS—SHEET 4.

Witnesses:

Inventor:
Joseph A. Groebli
by Charles G. Hensley
Attorney.

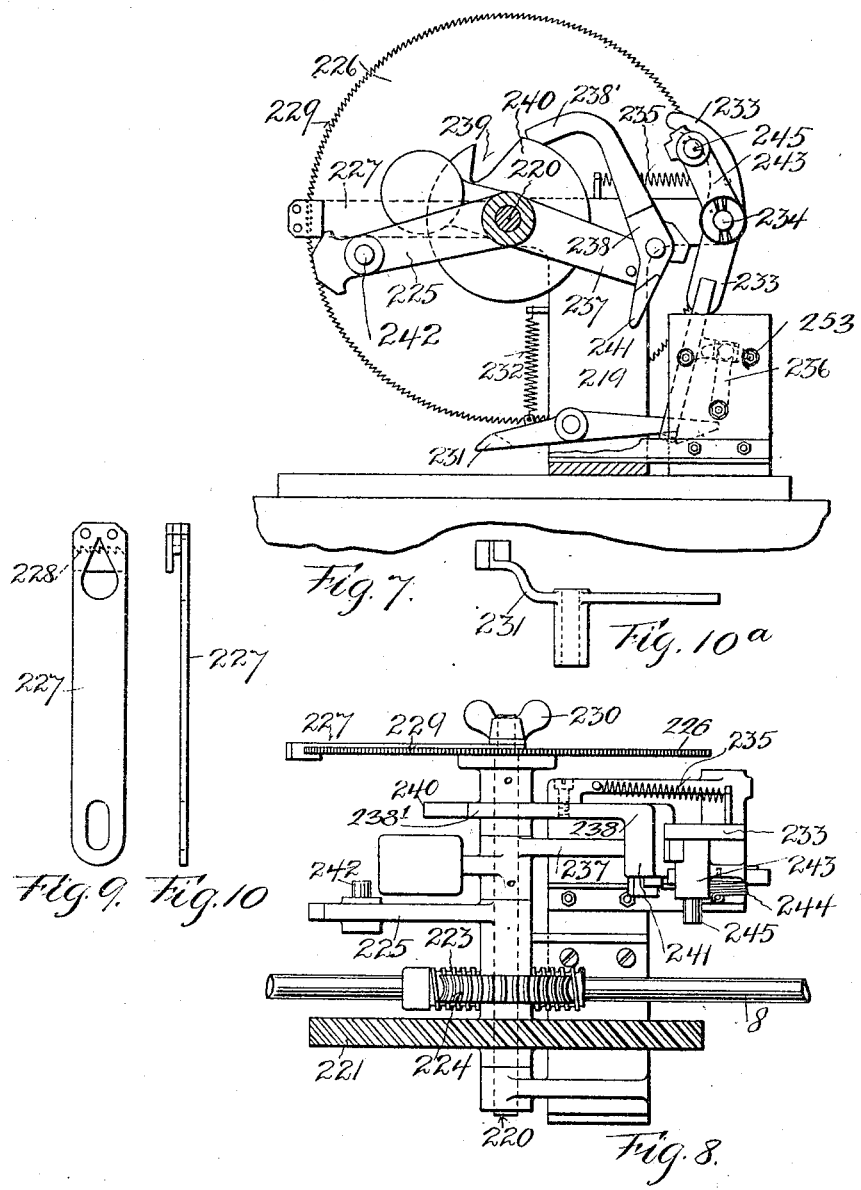

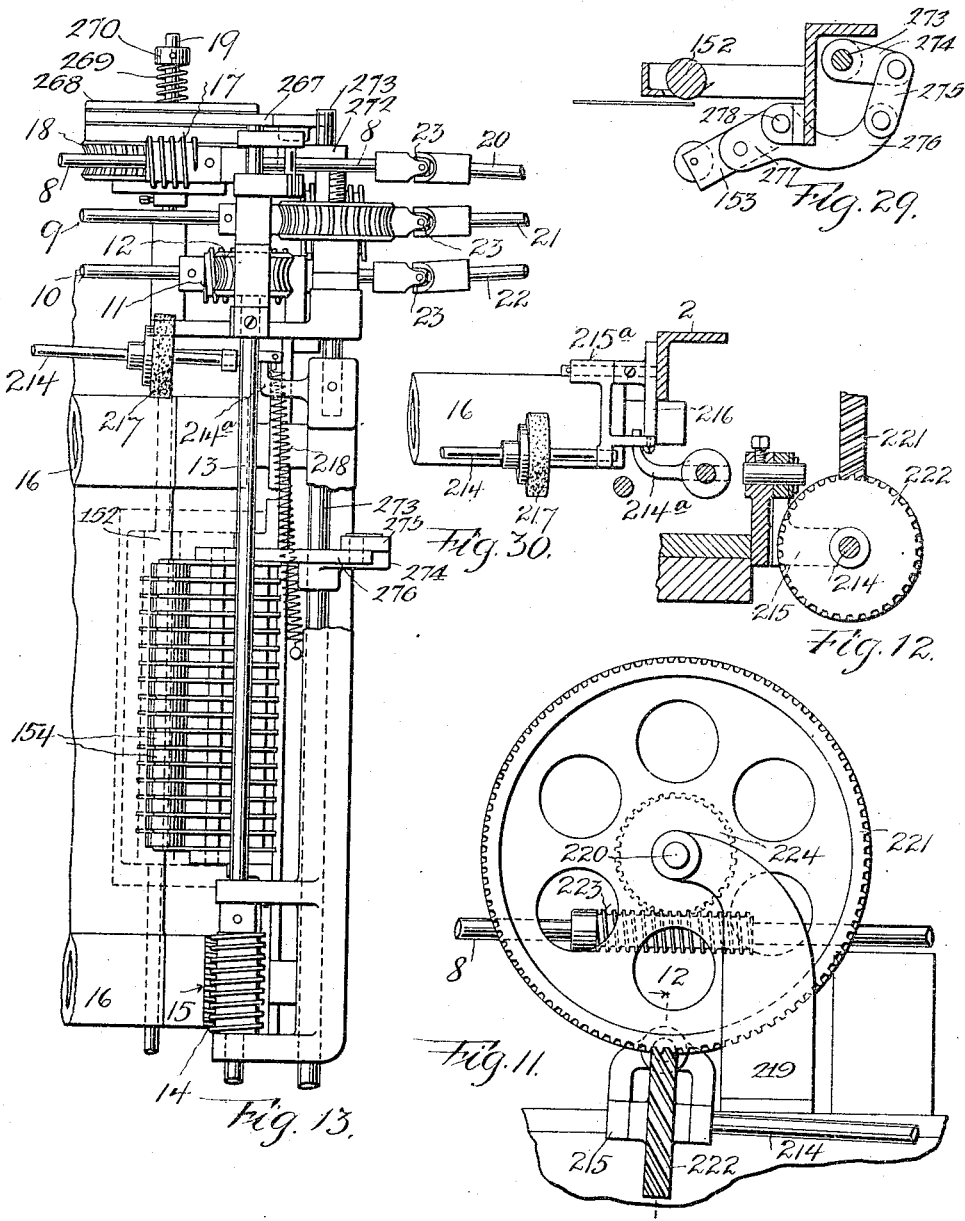

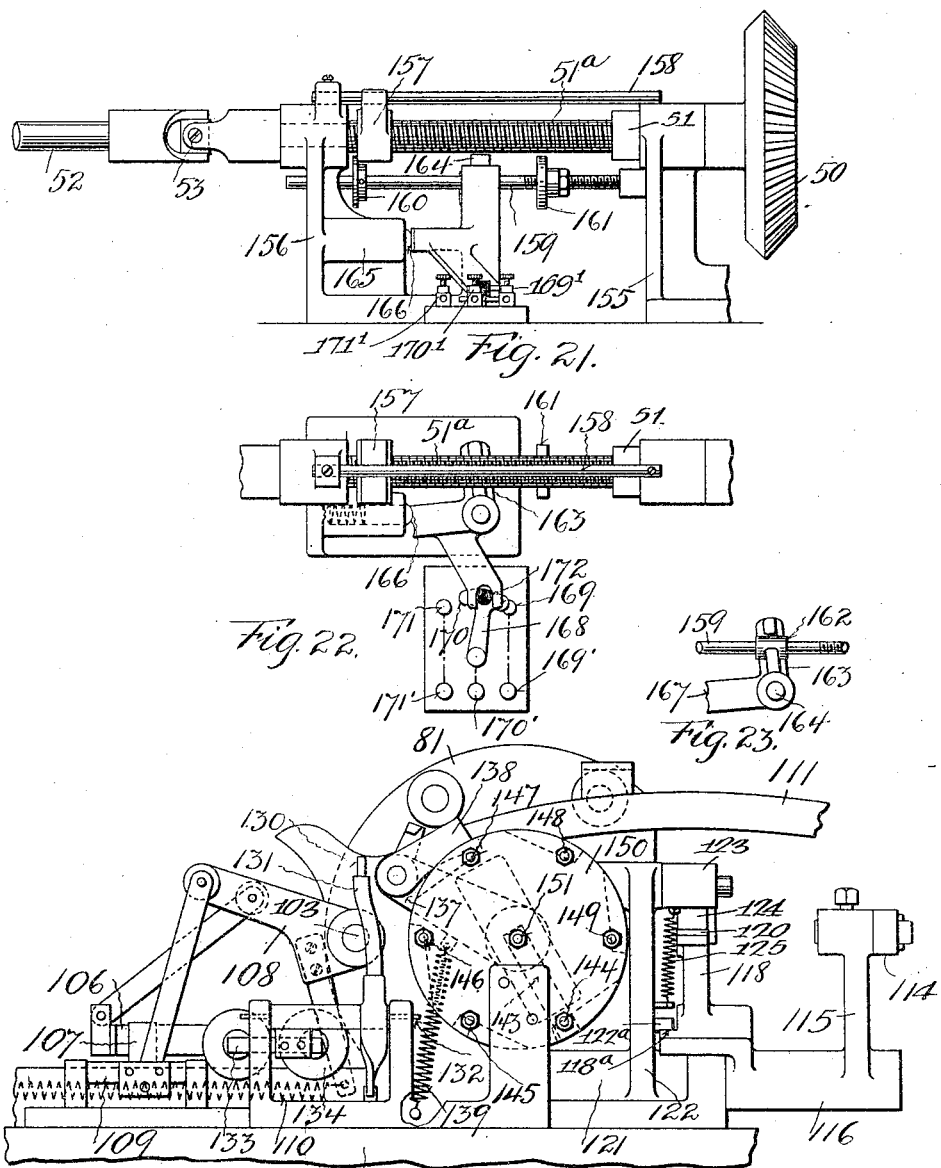

J. A. GROEBLI.
FABRIC SHIFTING AND TENSIONING MECHANISM FOR EMBROIDERING MACHINES.
APPLICATION FILED JAN. 10, 1914.

1,210,793.

Patented Jan. 2, 1917.
13 SHEETS—SHEET 8.

Witnesses:
A. B. Dollard
R. Rothersen

Inventor:
Joseph A. Groebli
by Charles G. Hensley
Attorney.

J. A. GROEBLI.
FABRIC SHIFTING AND TENSIONING MECHANISM FOR EMBROIDERING MACHINES.
APPLICATION FILED JAN. 10, 1914.
1,210,793.
Patented Jan. 2, 1917.
13 SHEETS—SHEET 9.
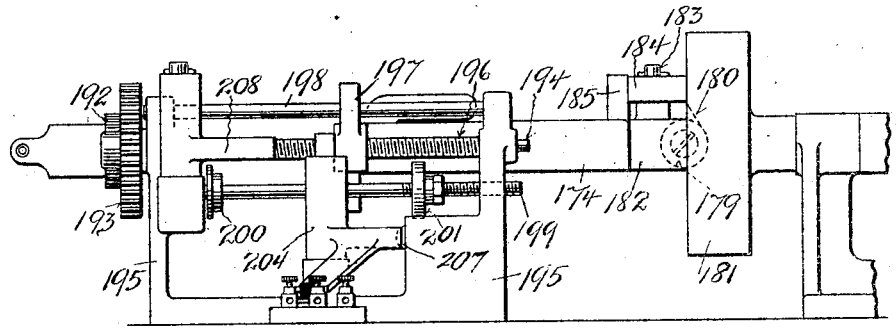
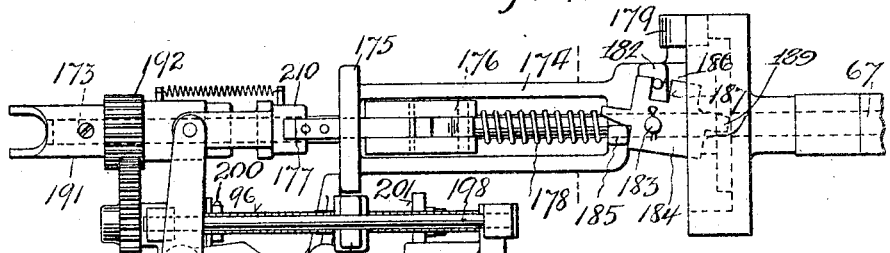
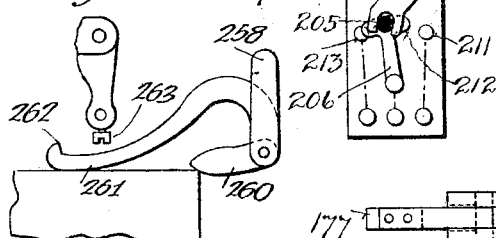
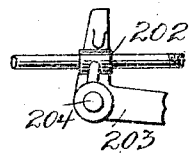
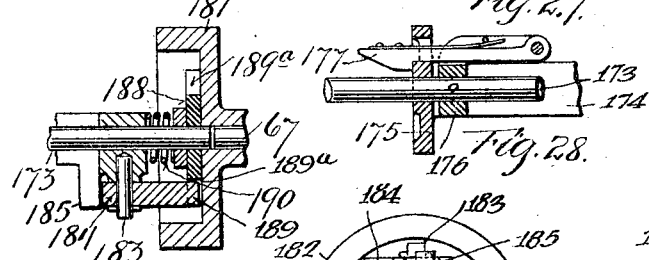
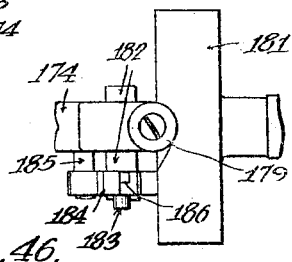
Witnesses:
A. B. Dollard
R. Rotheroe
Inventor:
Joseph A. Groebli
by Charles G. Hensley
Attorney.

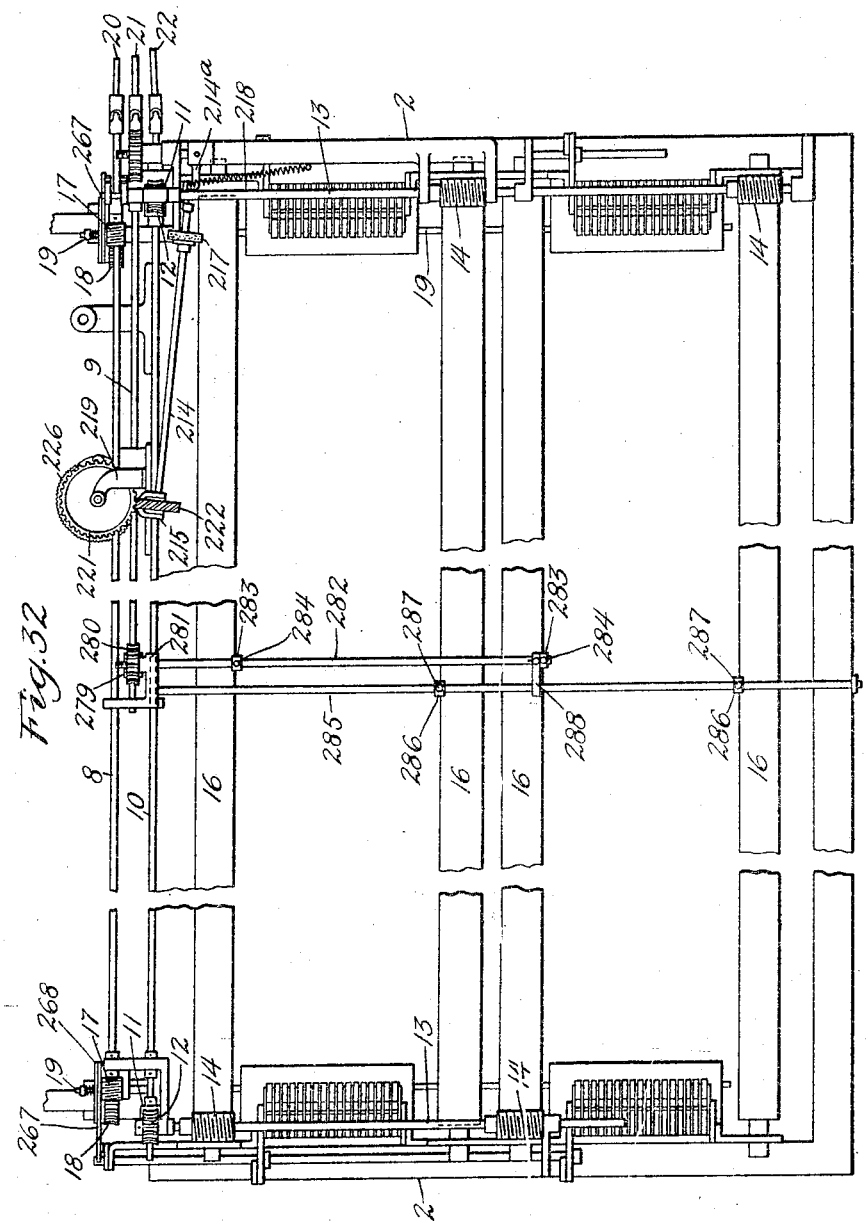

J. A. GROEBLI.
FABRIC SHIFTING AND TENSIONING MECHANISM FOR EMBROIDERING MACHINES.
APPLICATION FILED JAN. 10, 1914.
1,210,793.
Patented Jan. 2, 1917.
13 SHEETS—SHEET 11.
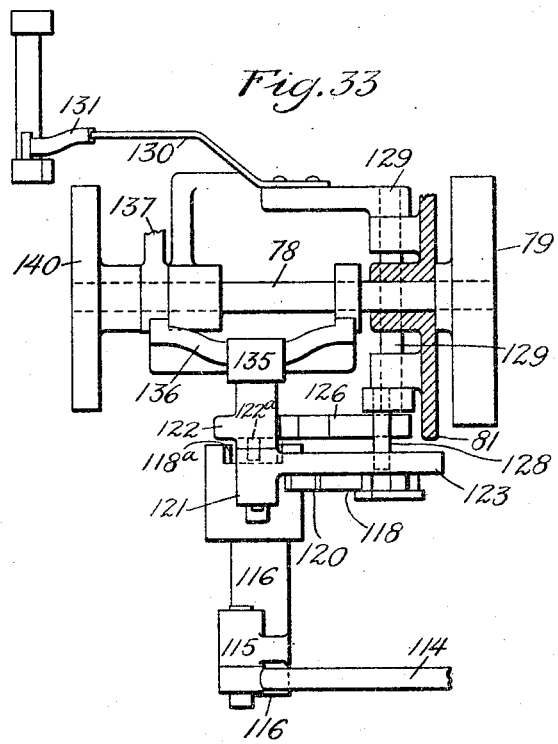
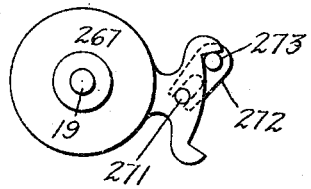
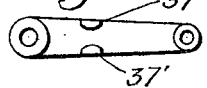
Witnesses:
Inventor:
Joseph A. Groebli
by Charles G. Hensley
Attorney.

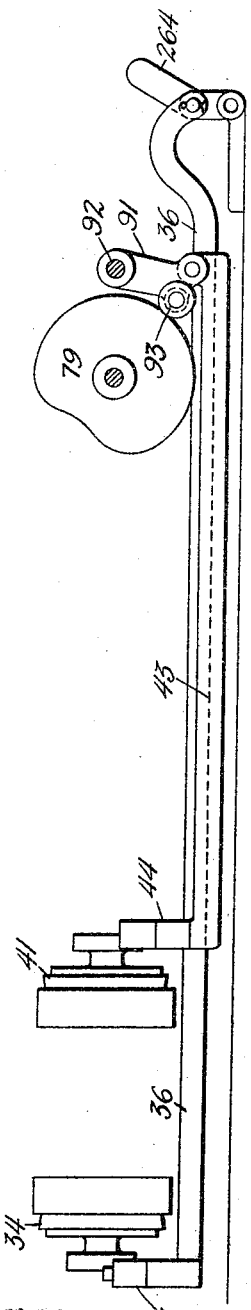
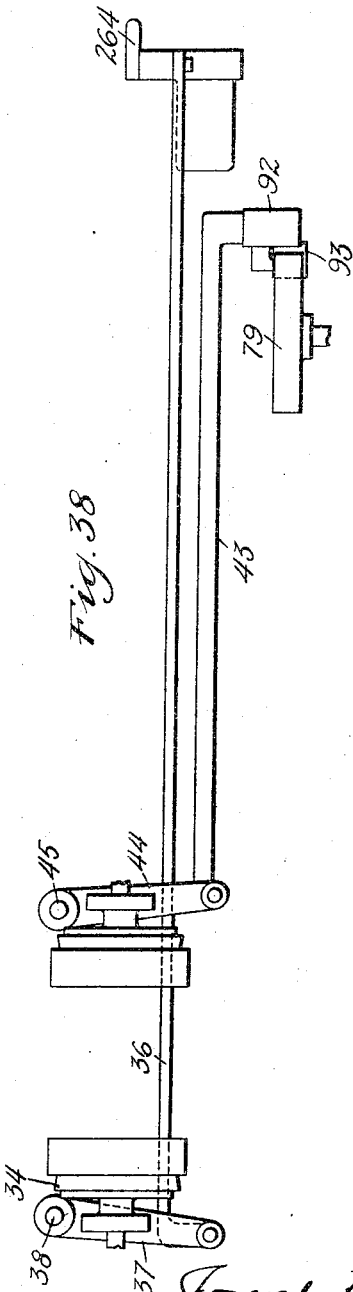

J. A. GROEBLI.
FABRIC SHIFTING AND TENSIONING MECHANISM FOR EMBROIDERING MACHINES.
APPLICATION FILED JAN. 10, 1914.

1,210,793.

Patented Jan. 2, 1917.

13 SHEETS—SHEET 13.

Witnesses:

Inventor:
Joseph A. Groebli
by Charles G. Hensley
Attorney.

UNITED STATES PATENT OFFICE.

JOSEPH A. GROEBLI, OF NEW YORK, N. Y.

FABRIC SHIFTING AND TENSIONING MECHANISM FOR EMBROIDERING-MACHINES.

1,210,793.　　　　　　　Specification of Letters Patent.　　　Patented Jan. 2, 1917.

Application filed January 10, 1914. Serial No. 811,289.

*To all whom it may concern:*

Be it known that I, JOSEPH A. GROEBLI, a citizen of the United States, and a resident of the city, county, and State of New York, have invented certain new and useful Fabric Shifting and Tensioning Mechanisms for Embroidering-Machines, of which the following is a specification.

The present invention relates to embroidering machines of the large type wherein a movable tambour frame carrying one or more sheets of fabric is moved in various directions and extents in a plane, so that the many needles, which move in unchanging paths, will pierce the fabrics at different positions and thus produce stitches upon the fabric.

In such machines it is customary to arrange fabric supports or rollers, generally in pairs, upon the tambour frame in such manner as to hold the sheet of fabric intermediate the rollers of each pair in a vertical plane, to be stitched by the needles; and it is also customary to provide these rollers with a supply of fabric, sufficient to enable a large number of rapport rows of stitches or designs to be worked upon each piece of fabric. As the fabrics are usually stretched between the rollers in large sheets, or fields, sometimes as long as thirty feet, and several feet in height, the fabrics must be tensioned, both in a vertical and horizontal direction, and be held taut and smooth during the stitching operations, in order to obtain a uniform and accurate product. The rollers are practically limited in their weight, and therefore their rigidity, because of the mobility of the tambour frame; and, because of their great length, they tend to sag or become distorted between their ends, especially when the fabrics between them are under tension. It is therefore necessary to support these rollers between their ends during the stitching operations. This is usually accomplished by providing intermediate supports or brackets, which must be movable in relation to the rollers, because they must be released from engagement therewith to permit of freedom in the shifting of the fabric.

The side tension devices, which place a horizontal or lateral stress upon the fabric, must hold the fabric smooth and taut; but, in order to permit the fabrics to be shifted, they must be more or less released or disengaged therefrom.

The fabrics are usually shifted, to bring new or embroidered portions in line with the stitching devices, by turning the fabric rollers to shift the fabric from one roller of each pair to the other; and the longitudinal and vertical stresses are generally taken off the fabrics to permit of this shifting, and are afterward applied again.

The various operations necessary to shift the fabrics and tension them, such as releasing the brackets, releasing the vertical tension, releasing the side tension devices, operating the rollers to shift the fabric, tightening vertical tension, and tightening the side tension devices, have heretofore been performed by manual labor, which made the results irregular and uncertain; and besides this, the operations required considerable time. Several of these operations must be performed in definite relative order or sequence.

The purpose of the present invention is to provide means for automatically carrying out, in proper sequence, the several operations necessary for shifting and tensioning the fabrics.

One of the important objects of the present invention is to provide mechanism whereby the completion of the operation of one of the fabric affecting devices will automatically initiate the operation of one or more of the devices which must succeed it in proper sequence of operation. By making the mechanism so that the completion of one function will automatically initiate another and necessarily succeeding function, it is possible to allow a sufficient period of time for the completion of each function, and to still perform all of the functions within a minimum period of time. Another result thereof is that one or more of the individual fabric-actuating devices may be adjusted to cause greater or lesser movements, according to differing requirements, and still retain proper sequence in the operations of the several devices, and without unnecessarily extending the period of the complete set of operations. Let it be assumed that, starting with the fabric in the condition following the formation of a row of embroidery, the fabric is to be loosened, shifted and again tensioned; and let it be assumed that in the complete operation there are five separate steps as, 1st, releasing the side tension; 2nd, releasing the vertical tension; 3rd, shifting the fabric; 4th, applying the vertical tension; and 5th, applying the lateral tension. These several steps must not only operate in a certain sequence, but some one or more may have to be varied in extent or period of time in order to create different tensions for different kinds of fabrics, or to shift the fabrics to different extents. One method of allowing for these changes would be to allow a maximum period for each step of the operation, within the limits of which one or more of the several independent devices may be varied; but in that case the complete operation would be unnecessarily lengthened, as there would at times be periods when one or more of the several fabric actuating devices would remain idle. In the present machine, however, the extent or period of time of operation of one or more of the fabric actuating devices may be individually extended or shortened, as conditions may demand; but the entire cycle of operation will take place in the shortest time i. e., the actual operating time consumed by the several devices, so that there need be no periods of inactivity. In addition, the present machine makes it practically impossible for one device to operate until the operation of the devices which must precede it has taken place, even though the extents or periods of time of operation of the several fabric affecting devices are varied or adjusted.

Another object of the present invention is to reduce the number of different mechanical movements necessary for operating the several fabric devices and to this end all the operations are initiated from a common source, preferably a cam. This not only reduces the number of mechanical movements, but it also insures proper sequence, and permits of their being reduced to a minimum period of time in any set of conditions.

In addition to the above, the present invention includes features relating to the different fabric controlling devices. In some branches of the machine it is desirable to operate a tensioning device in a positive manner or a definite extent, first, and to then continue to apply the operating force, but under conditions which permit the tension of the fabric to modify the action of the operating force, as by means of slipping action between the operating source and the fabric tensioning members. In other branches of the machine it is advantageous to first operate the fabric devices in a resistable manner, so that there may be a slipping action between the fabric and the source of operating power, and then to continue the operation in a positive manner a given and adjustable extent. The present machine is adapted to meet all of these requirements, so that the various operations may all be performed in the most successful manner.

In addition to the above, the present invention embodies novel means for automatically controlling the extent of fabric shifted during the reeling operation. Where the fabric is wound upon a support, as upon a roller, the diameter thereof increases or decreases as the fabric is wound on or off the same; and, therefore exactness cannot be fully obtained by measuring the fabric-shifting operation by the number of revolutions of such a roller. In the present machine the shifting of the fabric is controlled according to the distance the fabric is moved, regardless of any change in the size of the roll of fabric on the roller. I am thereby able to regulate more accurately the automatic shifting of the fabric.

Under the present invention, much of the heavier mechanism may be, and preferably is, located on a stationary support, so that the tambour frame need not be burdened therewith.

Hereinafter I will describe in detail the best known embodiment of my invention; but it is possible to embody the essence of the invention in other forms and arrangements, within the scope of the annexed claims.

Still other features than those above enumerated will be set forth in the detailed description and in the claims. And it will be understood that some branches of the present machine may be segregated and used separately to perform their peculiar functions.

Figure 5:
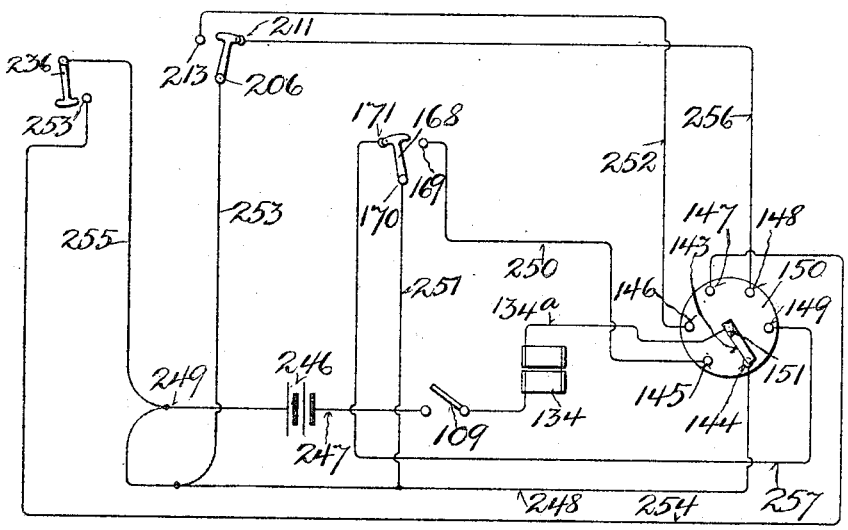
Figure 6:
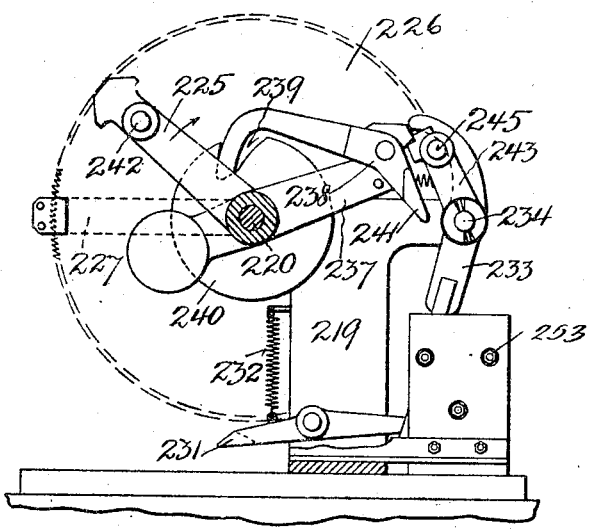
Figure 15:
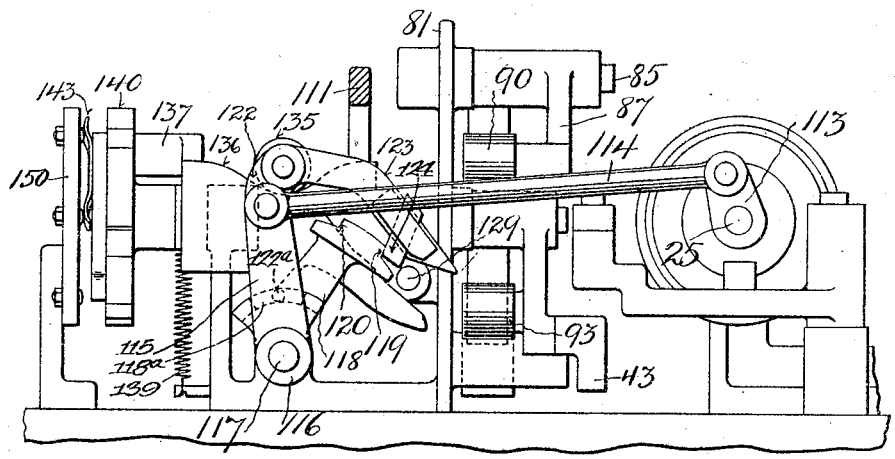
Figure 16:
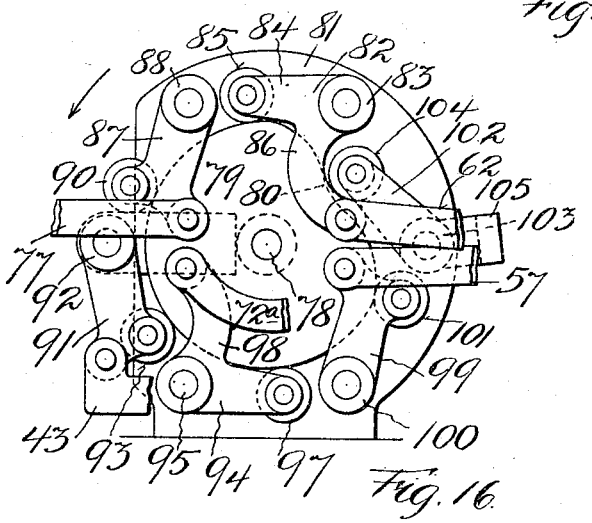
Figure 17:
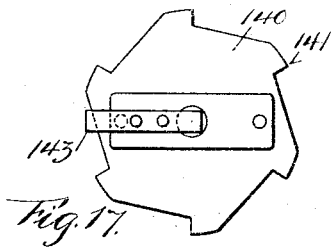
Figure 18:
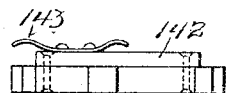
Figures 19, 20:
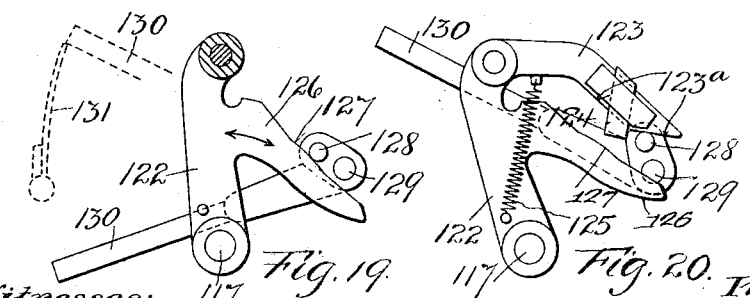
Figure 39:
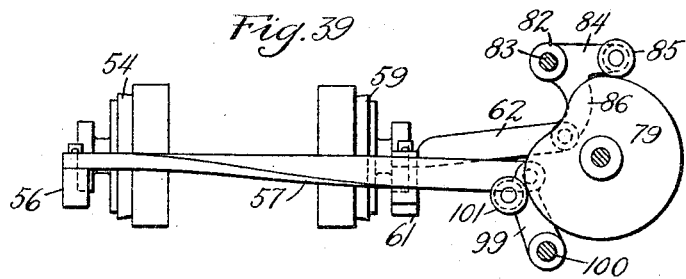
Figure 40:
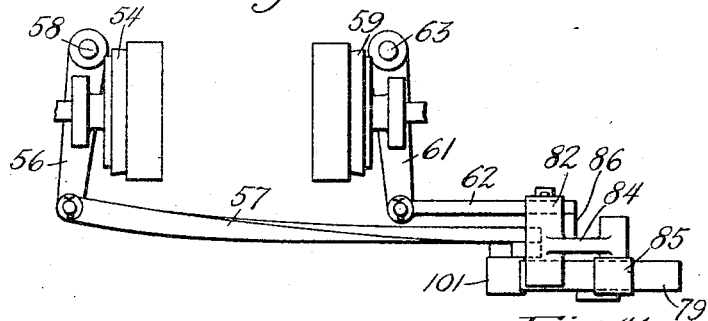
Figure 43:
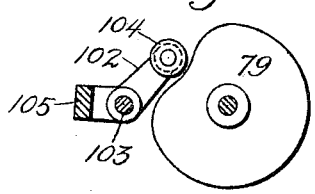
Figure 41:
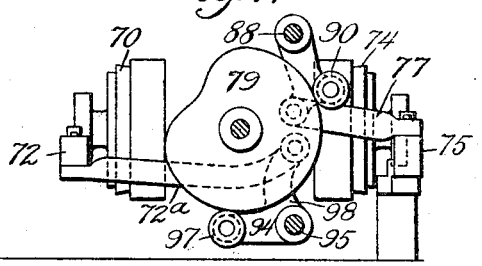
Figure 44:
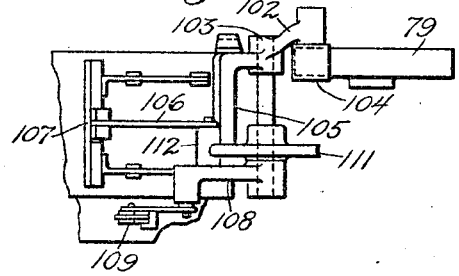
Figure 42:
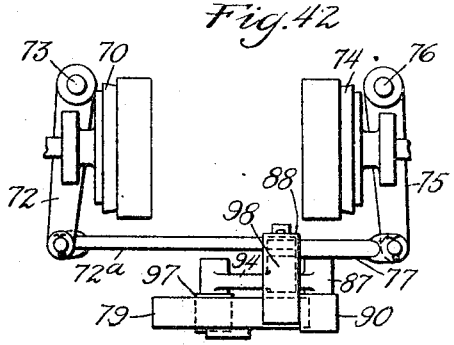

In the drawings forming part of this application, Figure 1 is a front elevation of an embroidering machine embodying my invention, wherein the various stitching devices are omitted to simplify the drawing, Fig. 2 is a plan view of the mechanism to which my present invention more particularly relates, Fig. 3 is a sectional view, taken on the line 3—3 of Fig. 4, looking upward and showing the several clutches and their controlling levers; Fig. 4 is a plan view of the several clutches, gears, switches and associated parts, with a part broken away to show, in section, the details of a clutch; Fig. 5 is a diagrammatic view of the electrical wiring; Fig. 6 is a sectional view showing the various parts associated with the dial by which the extent of the fabric shifting operation is controlled; Fig. 7 is a similar view, but showing the parts in a different position; Fig. 8 is a plan view thereof; Fig. 9 is an elevation of the arm which is set at different positions on the dial to arrest the shifting operation; Fig. 10 is an edge view thereof; Fig. 10$^a$ is a plan view of a lever associated with the shifting device; Fig. 11 is an elevation showing part of the transmission employed in the fabric-shifting control device, Fig. 12 is a sectional view, taken on the line 12—12 of Fig. 11, looking to the right; Fig. 13 is an elevation of a portion of one end of the embroidering machine, showing the fabric rollers, side tension device, reeling mechanism, and the means for connecting these various devices with their operating mechanisms, Fig. 14 is an elevation of the devices for advancing the electrical connection and the switches for throwing the automatic mechanism into and out of operation, and is substantially a view looking upwardly at the device shown in the right half of Fig. 4; Fig. 15 is an elevation showing the devices for advancing the operating cam step by step; and it is an end view looking at the right hand end of Fig. 4; Fig. 16 is an elevation of the operating cam and the several levers directly associated therewith, taken from the opposite side to that shown in Fig. 3, Fig. 17 is an elevation of the ratchet by which the cam shaft is intermittently revolved; Fig. 18 is a plan view of the disk for advancing the electrical contacts to insure the proper sequence in the different operations; Figs. 19 and 20 are elevations of different pawls; Figs. 21 and 22 are an elevation and a plan view, respectively, of the device for terminating the operation of the side tension devices and for initiating the operation of another fabric affecting device; Fig. 23 is a detail view of a portion thereof the switch operating cam being omitted, Figs. 24 and 25 are an elevation and a plan respectively, of the device for terminating the operation of the bracket device and for initiating the operation of a succeeding device, Figs. 26, 27 and 28 are detail views of portions thereof; Fig. 29 is a sectional view, showing the operation of the side tension device; Fig. 30 is a sectional view showing the connection of the roller which measures the fabric shifted and which controls the extent of the shifting operation, Fig. 31 is a horizontal sectional view of the flanged wheel and swinging latch shown at the right in Fig. 25, Fig. 32, is a rear elevation of the tambour frame showing the connections for the feed, lateral tension, vertical tension and measuring devices in their proper relations, Fig. 33, shows in plan the connections of the various elements for advancing the operating cam step by step, Fig. 34 is a plan view of the friction disk and connections for opening and closing the side tension devices, Fig. 35, is a plan view of one of the levers for controlling the clutches, Fig. 36, is a cross sectional view of the same, showing the hub of the clutch in position between the lugs on the arm, Fig. 37 is a diagrammatic elevation showing the connections between the hand lever and the governing cam and their respective clutches for controlling the fabric rollers, Fig. 38 is a plan view of the same, Fig. 39 is a diagrammatic elevation of the connections between the governing cam and the clutches for controlling the side tension devices, Fig. 40 is a plan view of the same, Fig. 41 is a diagrammatic elevation of the connections between the governing cam and the vertical tension devices, Fig. 42 is a plan view of the same, Fig. 43 is a diagrammatic elevation, partly in section, of the governing cam and the switch controlling lever, Fig. 44 is a plan view of the same showing also the switches. Fig. 45 is a detail plan view of the parts for throwing the bracket device out of operation. Fig. 46 is a sectional view showing similar parts, but with some of the parts in different positions to that shown in Fig. 45, and Fig. 47 is a detail view of one of the hand levers.

As previously stated, I prefer to employ the present mechanism, in a machine embodying fabric shifting means, side tension and vertical tension devices.

In Fig. 13 I have shown one end of the tambour frame and connections of an embroidering machine for the purpose of illustrating the manner of connecting the operating and controlling parts with the above mentioned devices; and in Fig. 1 I have shown a general view of the frame, the tambour frame and connections of an embroidering machine.

In Fig. 1, there is shown the stationary frame 1, of a conventional embroidering machine, upon which the tambour frame 2 is supported by means of a parallel motion and counterbalancing device 3, of ordinary construction, whereby the tambour frame may be moved in various directions in its vertical plane. An ordinary pantograph device is represented at 4, the purpose of which is to permit the operator to move the tambour frame in different directions according to a design held upon the pattern board 5. All of these parts may be of usual construction; and, if preferred, the tambour frame may be controlled by means of a jacquard or automat, in so far as my present invention is concerned.

The present mechanisms for controlling and operating the various fabric devices may be mounted upon either the stationary frame or the tambour frame, but, in order to relieve the latter of as much of the weight as possible, I prefer to mount such mechanisms upon the stationary frame and transmit the operations to the devices on the tambour frame by means of flexible and telescoping means. The mechanisms here referred to are shown supported upon a bed or shelf 6 which is supported upon the stationary frame by means of brackets 7 and is located behind the pattern board 5.

The shaft 8 operates the side tension devices, the shaft 9 the vertical tension devices, and the shaft 10 the fabric rollers. And I will hereinafter explain means which may be used for those purposes, although those means are not part of the invention claimed in this present application.

The shafts 8, 9, 10, are operatively connected, with their actuating and controlling mechanism, by means of the several shafts 20, 21, 22, through the universal connections 23 which permit free movement of the tambour frame in relation to the parts which are mounted upon the stationary frame, the several shafts 20, 21 and 22 being each composed of sections which telescope at 24 (see Fig. 2).

Upon the bed 6 is supported a lateral shaft 25 on which are mounted the several gears by which the shafts 8, 9, 10 may be turned in either direction. The power for operating the complete mechanism is preferably applied directly to the shaft 25, as by means of an electric motor 26 operating through the gears 27 and 28; and from this shaft 25 preferably all, or nearly all, of the several mechanical movements are distributed.

The shaft 25 has a pair of miter gears 29, 30 loose thereon, both of which continually mesh with a miter gear 31. The latter is secured to a short shaft 32 (see Figs. 2 and 4) mounted in a bearing upon the bed; and this latter shaft is in turn operatively connected by means of a knuckle joint 33 with the shaft 22. These gears 29, 30, being always in mesh with the gear 31, it is only necessary to cause either one or the other of their gears 29, 30 to turn with their shaft 25 in order to revolve the shaft 22 one way or the other; and as there is no intermediate position or adjustment necessary to permit shifting the gears it is only necessary to throw one or the other of the gears 29, 30 into operation. By employing connections of this character I reduce the movements to a minimum and make it possible to initiate the operation of one fabric affecting device by the completion of the operation of a preceding one.

There is a friction clutch 34 keyed to the shaft 25 as by a spline, and therefore revolving with it, in such a way that it can slide axially on it; and it is arranged to clutch the gear member 29 to cause the latter to revolve, and thereby turn, the shaft 22 and the fabric roller. The clutch 34 is drawn out of engagement with the gear 29 by means of a spring 35 which draws the link 36. The latter, which is operated by means to be hereinafter described, acts upon the lever 37, which has a pair of lugs or fingers 37' engaging on opposite sides of the hub 40 of the clutch member 34, and serves to move the clutch member toward the gear member 29. In this manner the clutch is thrown out by spring pressure and thrown in by other means.

The engagement of the levers 44, 56, 61, 72 and 75 with their respective hubs is in each case similar to that of the lever 37 and the hub 40.

A similar clutch 41, but oppositely positioned, is shown slidably keyed to the shaft 25. This clutch acts upon the gear 30, and serves to throw the latter into operative relation with the shaft 25 and thereby cause the revolution of the shaft 32 in a direction reverse to that caused by the gear 29. The clutch 41 is moved into operative engagement with the gear 30 by means of a spring 42, acting upon the lever 44 which is fulcrumed to the bed at 45; and this lever engages the hub of the clutch member 41. Through these parts the clutch 41 is thrown in by spring action and released by positive means through the link 43. The clutches 34 and 41 however, cannot both be thrown in at the same time, as will appear from the further description of their operating means hereinafter contained. The clutches 34, 41, and others to be referred to, may be of ordinary construction. The form herein shown has a frusto-conical friction part 46, formed of laminated raw hide, arranged to engage a conical recess 47 in the gear member.

The above constitutes the means for turning the fabric rollers in one direction, from the shaft 25, for the purpose of shifting the fabrics to bring new or unembroidered portions before the rows of needles.

Loosely mounted upon the shaft 25 there are oppositely arranged miter gears 48, 49, similar to the gears 29, 30. They both mesh at all times with a gear 50 which is fast upon a shaft 51 mounted in a bearing upon the bed. The shaft 51 is connected by intervening mechanism, including a knuckle joint 53 and a shaft 52, with the shaft 20 which operates the side-tension-device shaft 8.

The clutch 54, which is similar to the clutch 34, is moved into engagement with the gear member 48 by means of a spring 55 connected at one end with a lever 56 and at its other end with a lever 61. The lever 56, which is operated through a link 57, is fulcrumed to the bed at 58; and it has an arm engaging the grooved hub of the clutch member 54, similar to the connection of the lever 37 with its clutch.

There is another clutch member 59 which is arranged to engage the gear member 49; and it is caused to engage the gear member by means of the spring 55 acting on the lever 61. This lever, 61, is operated through a link 62; and it is fulcrumed to the base at 63 and has an arm engaging the grooved hub of the clutch member 59, similar to the connection of the lever 37 with its clutch.

Whenever the clutch 59 is thrown in to engage its gear 49, the shaft 51, and through it the shaft 8, will be revolved in one direction; and, whenever the clutch 54 is thrown in to engage its gear member 48, this shaft 51, and through it the shaft 8, will be revolved in the opposite direction. It is to be understood that both these clutches cannot be thrown in at the same time as that might cause breakage.

There is still another set of clutches and gears for operating the third shaft, 9. The miter gears 64 and 65 loosely mounted on the shaft 25, both mesh with the gear 66. The latter is fast upon the shaft 67, which is mounted in a bearing upon the base and is connected, through intermediate mechanism, including a knuckle joint 69 and a short shaft 68, with the shaft 21 which operates the vertical tensioning or truing devices.

The clutch 70, rotating with the shaft 25, is arranged to engage the gear member 64 to cause the latter to revolve with the shaft 25. This clutch is thrown in by means of a spring 71 fastened at one end to and acting on the lever 72, and fastened at its other end to the lever 75; and is thrown out by positive means. The lever 72 is fulcrumed to the base at 73 and it has an arm engaging the grooved hub of the clutch 70.

Another clutch 74, rotating with the shaft 25, is arranged to engage the gear member 65 to cause the latter to turn with its shaft. This clutch is thrown in by means of the spring 71 acting on the lever 75; and it is thrown out by positive means, as in the cases of the previously described clutches. The lever 75 is fulcrumed to the bed at 76; and it has an arm engaging the grooved hub of the clutch member 74. It is operated through link 77, as will be apparent from the subsequent description.

Through either the clutch 70 or 74, acting on their respective gear members, the motion of the shaft 25 may be transmitted to the shaft 21, to operate the latter in one or the other direction.

From the above description it will be apparent that all three shafts 8, 9, 10 are operated from the same shaft 25; i. e. the shaft 8 through shaft 20, telescoping joint 24, shaft 52, knuckle joint 53, shaft 51 and gears 50, 49 and 48; the shaft 9 through shaft 21, telescoping joint, knuckle joint 69 shaft 67 and gears 66, 65 and 64; and the shaft 10 through shaft 22, telescoping joint 24, knuckle joint 33, shaft 32 and gears 31, 30 and 29; and that through the several clutches and gears they may be each caused to revolve in either direction; and that only two mechanical movements are required to control each shaft. That is to say, it is only necessary to operate one clutch or the other of the pair to cause a corresponding shaft to be revolved. Owing to the fact that each pair of mitered gears is continuously in mesh with its respective gear 31, 50, or 66, as the case may be, there is no necessity for a third operation to control one of the several shafts 8, 9, 10.

There are several devices for modifying the action of the shaft 25 on the shafts 8, 9 and 10 as will be made apparent hereinafter; but the operation and direction of said latter shafts is controlled through the above mentioned clutches and gears.

In order to control the operation and direction of the several shafts 8, 9, 10, the several clutches, except clutch 34, are preferably operated from a common source, in such a manner that only one of the shafts will be operated at a time and so that all the operations must take place in the sequence necessary to obtain proper operation of the several fabric-affecting devices. The several clutches are operated preferably from a common cam, which is itself moved intermittently, but not necessarily in definite time periods. It is operated, rather, according to the various periods which may be required for the individual operations of the several fabric devices, which may vary for different operations of the machine.

Upon a shaft 78, mounted in bearings upon the bed 6 and arranged at right angles to the shaft 25, there is fixed a cam 79 having a cam surface which, around the greater part of its circumference, is concentric with the shaft, and which is provided with a recessed or depressed portion 80. The levers for controlling the several clutches are clustered around and are operated by this cam.

A plate 81 serves as a support for the several levers. A lever 82 is fulcrumed to the plate at 83; and it has one arm 84 provided with a roller 85 which travels in contact with the periphery of the cam 79, while the other arm 86 is fulcrumed to the link 62 through which the clutch 59 is controlled. Whenever the lever 82 is rocked, through the action of the cam 79 or the spring 55, the clutch 59 is either thrown in or out. Whenever the roller 85 is on the higher portion of the cam the clutch will be held out; and when the lower portion of the cam is opposite the roller 85, the clutch 59 will be thrown in by the action of the spring 55. In this way the clutch is thrown in by spring action and thrown out by the positive action of the cam. In addition to throwing the clutch in, the spring 55 also causes the roller 85 to follow the cam. Whenever the clutch 59 is thrown in, the shafts 20 and 8, will be revolved in that direction which is necessary to loosen the side tension device.

The lever 87 is next to the lever 82 in time of operation. This lever is fulcrumed at 88. It is fulcrumed to the link 77 through which the clutch 74 is operated; and it is provided with a roller 90 which follows the surface of the cam. Whenever the low portion of the cam is opposite the roller 90 the clutch 74 is thrown in by the action of its spring 71;

but at all other times the cam holds the clutch out. Whenever this clutch is in, the shafts 21 and 9, will be revolved in that direction which is necessary to loosen or disengage the vertical truing and tensioning devices, preparatory to the fabric shifting operation.

Next in its order of the operation by the cam 79 is the lever 91. This is fulcrumed at 92; and it is fulcrumed to the link 43 through which the clutch 41 is controlled. The lever carries a roller 93 which contacts with the cam. Whenever the low portion of the cam is opposite this roller the spring 42 will throw in the clutch 41. At all other times this clutch will be thrown out. Whenever the clutch is in, the shafts 22 and 10 will be revolved in the direction which is necessary to operate the fabric rollers to shift the fabric.

It may be here stated that the automatic device only controls the shifting of the fabric in one direction, and therefore there is no lever operated by the cam 79 for controlling the clutch 34. As this clutch governs the backward shifting of the fabric, it is controlled by the operator, through a manually operated member, as will be hereinafter explained. It is sufficient for the automatic mechanism to control the starting of the fabric-shifting operation in one direction, and its stopping.

The next lever controlled by the cam 79 is numbered 94. This is fulcrumed at 95 and has an arm 98 fulcrumed to the link 72ª, through which the clutch 70 is controlled. The other arm of this lever 94 has a roller 97 engaging the cam. Whenever the low portion of the cam is opposite this roller the spring 71 will throw the clutch in; and this will cause the operation of the shafts 21 and 9, in that direction which is necessary to move the vertical truing and tensioning devices into engagement with the fabric rollers and to place the vertical tension upon the fabric, if these two operations are performed simultaneously.

There is another clutch operating lever operated from the cam 79. This lever 99 is fulcrumed at 100; and it is fulcrumed to the link 57 which controls the clutch 54. This lever has a roller 101 contacting with the cam 79. When the low portion of the cam is opposite this roller the spring 60 throws in the clutch 54; but at all other times this clutch is held out by the cam. When this clutch is thrown in, the shafts 20 and 8, will be revolved in that direction which is necessary to throw the side tension devices into engagement with the fabric and to cause them to tension the fabric.

I have shown another and sixth lever operated by the cam 79, which performs the function of stopping the mechanism when the complete cycle of operations incident to the shifting and tensioning of the fabric has been completed. This lever 102 is fulcrumed at 103; and it has one arm provided with a roller 104 which contacts with the cam 79. This lever 102 has an arm 105 which is connected to the movable portion 106 of a knife switch 107 by means of which the motor is started and stopped (see Figs. 4 and 14). The arm 108 is connected to the movable portion 109 of a knife switch which controls another electrical circuit. Whenever the low portion of the cam 79 is opposite the roller 104 the lever arm 108 will be held up by means of a spring 110 attached to an extension of the arm 108; but at all other times the lever will be held down by the cam 79, and the several switches will be held closed. That is to say, the cam 79 will hold the switches closed while it is making one complete revolution until the depressed portion comes under the roller 104 and then the spring 110 will throw out the switches or break the circuits by throwing up the lever arm 108. This lever may be thrown down however, by the operator, whenever the mechanism is to be started. For this purpose there is a hand lever 111 fulcrumed to the shaft 103; and it is arranged to engage a lateral extension 112 of the arm 108, for the purpose of rocking the switch operating levers whenever the hand lever is moved upwardly at its free end.

Whenever the hand lever is thus operated it causes the closing of the electric circuits, which instantly starts the motor; and thus the operation of the machine is initiated. As soon as the motor starts, the lever 102 and its connections will be held by the cam 79 in the position brought about by the hand lever 111, until a complete revolution of the shaft 78 has been made when, (the hand lever 111 having been again depressed) the spring 110 will rock the lever 102 to break the circuits and stop the machine.

As was previously stated, the cam 79 is operated intermittently; and I prefer to take the operating force for this from the shaft 25. To that end I have shown a crank arm 113 on one end of the shaft 25; which operates through a pitman rod 114 and crank arm 115 to rock the hub 116 which is loose on the shaft 117. In this way the hub 116 is oscillated as the clutch shaft 25 revolves.

The hub 116, in addition to the crank arm, has an arm 118 (shown in Figs. 14 and 15) provided with a top which has two shoulders 119, 120. There is a second hub 121 on the shaft 117, which is independent of the first hub. It carries an upwardly extending arm 122, to the upper end of which is fulcrumed a pawl 123 having a block 124 arranged to fall into the path of the member 118, either before or behind the top of the latter. The pawl is moved into such path by means of a spring 125. The arm 122 also has a forwardly projecting member 126, having a cam surface 127, which acts upon a pin 128 to tilt a shaft 129. The forward end of the pawl 123 also rests on the pin 128 so that the latter determines when the pawl shall engage the rocking arm 118. Upon the other end of the shaft 129 there is carried a tripping member 130 which is held up by means of a trigger 131 that rocks on a pivot 132 (see Fig. 14). The hub of the trigger 131 carries an armature 133, in line with the cores of the magnets 134, which are included in the controlling circuit.

The tripping of the trigger 131 by the magnets will release the arm 130 and allow the latter to fall into the position shown in Fig. 19. The falling of the arm will rock the shaft 129; and the arm which carries the pin 128 will likewise fall, allowing the pawl 123 to come into the path of the arm 118. This latter is continuously being rocked by the crank connections 113, 114, 115. If the pawl block 124 comes down while the arm 118 is in the left position (viewing it as in Fig. 15) then the shoulder 119 will engage the pawl block in its movement to the right. If the pawl falls while the arm 118 is in its right hand position, then the shoulder 120 will engage the pawl block on the movement of the arm 118 to the left. The pawl will therefore engage the arm 118 in whichever direction the latter is moving; and, therefore, the engagement will be almost instantaneous.

In one case the arm 122 will be moved to the right; and in the other case it will be moved to the left. There is a roller 135 on the upper end of the arm 122, which engages with a cam 136 rocking loosely on the shaft 78. This cam has a surface so shaped that the cam will be rocked by the roller 135 in whichever direction the arm 122 is rocked. The purpose of these connections is to permit the pawl 123 to engage the arm 118 as soon as it falls, and to cause the rocking of the cam 136 immediately.

After the rocking of the shaft 129 and the dropping of the pawl 123 into engagement with the arm 118, the latter and the pawl move together, either to the right or the left. Near the end of this movement the cam surface of the arm 126 acts on the pin 128 to rock the shaft 129 and raise the arm 130 again into engagement with the trigger 131. Upon the return movement of the arm 122 one or the other of the surfaces 123$^a$, of the pawl will engage the pin 128 and cause the pawl to rise until the block 124 is disengaged from the arm 118.

The arm 122 has pin 122$^a$ traveling in a slot 118$^a$ of the arm 118. After the arm 122 has been moved to the right or left through the engagement of the pawl 123 with one or the other of the shoulders 119, 120 of the arm 118, the shoulder at one or the other end of the slot 118$^a$ acts upon the pin 122$^a$ to return the arm 122 back to the intermediate position shown in Fig. 15.

Integral with the cam body 136 there is an arm 137 which carries a pawl 138; the arm being pulled down, to hold the cam 136 in the position shown in Fig. 15, by a spring 139.

On the shaft 78 which carries the cam 79, there is fixed a ratchet disk 140, shown in detail in Fig. 17. This disk is shown provided with six teeth, 141, corresponding with the number of different positions to be given to the cam 79. The pawl 138 engages these teeth so that at every oscillation of the arm 137 the disk 140 and its shaft 78, as well as the cam 79, will be advanced one step or position, six of which are included in a complete revolution thereof.

The disk 140 carries a piece of insulation 142 to which is attached a contact piece 143. This contacts with pins 144, 145, 146, 147, 148, 149, stationarily supported opposite the end of the shaft 78; so that as the latter is successively advanced by the pawl 138 the contact piece 143 will make successive contacts with the several pins 144—149 which are connected with the terminals of various electrical circuits, as will be explained more fully hereinafter. The contact piece at one end remains continually in contact with a central pin 151. As the shaft 78 is revolved, therefore, the several pins 144—149 will be successively placed in electrical connection with the central pin 151.

I will next describe the devices by which the action of the operating mechanism upon the side tension and vertical tension devices is modified or terminated.

In Figs. 2, 13, 29, 32 and 34 are shown parts of the side tension device. These parts are all operated from the shaft 8.

As previously stated, the power for operating the shaft 8 is transmitted from gear 50 and shaft 52, through shaft 52, knuckle joint 53, telescoping joint 24 and shaft 20. As will be seen from Figs. 21 and 22, the shaft 51 is journaled in standards 155, 156 mounted upon the base 6; and between these standards the shaft has a screw thread 51$^a$. There is a threaded block 157 through which the threaded portion of the shaft 51 passes; and this block, by reason of the threaded connection, is caused to travel in a direction lengthwise of the shaft. To prevent the block from turning with the shaft so that it will be moved along by the latter, there is shown a rod 158 secured to the standards and passing loosely through a groove in the block. The block is free to move along this rod but is prevented by it from turning with the shaft.

There is a rod 159 mounted in the standards to have a slight longitudinal movement therein. Near one end of this rod there is shown a contact piece 160 which is, preferably, permanently fixed thereon. The other end of the rod has a screw thread on which the contact piece 161 is threaded so as to be adjustable along the rod. A sleeve 162 on the rod 159 engages with an arm 163 of a lever fulcrumed at 164 to the base of the standard 156. In a socket 165 there is a spring-pressed pin 166 which engages at one end in either of the notches 167 in one arm of the lever 163, to hold the latter in either of two positions, so as to prevent accidental shifting of the lever, and also to snap it over when it has passed the central position.

There is an electrical switch 168 mounted near the lever 163. It has contact points 169, 170, 171 with which the binding posts 169', 170', 171' are respectively in electrical connection; and upon the base of the switch there is a switch arm 172 which is electrically connected to post 170' and can make contact with one or the other of the points 169, 171 at any one time.

The electrical circuit and its functions will be fully explained in connection with the diagrammatic view of the wiring.

With the parts set as shown in Figs. 22 and 21, the electrical circuit which is closed will make it possible for the side-tension-device shaft to be operated to throw in and tighten the side tension devices, provided the current has been caused to pass through these members by the completion of the operation of that function which should properly precede the tightening of the side tension devices, in the present showing, the tightening of the vertical tension device. The contact piece 161 may have been adjusted to any desired position by screwing it along the rod 159; and the distance between the contact pieces 161 and 160 will determine the number of revolutions which will take place in the shaft 52 and therefore the extent of the tightening movement of the side tension devices, before this operation is terminated. This adjustment having been made and fixed, let it be assumed that the shafts 51, 52 and 8, are turned in the direction necessary to tighten the side tension devices. This operation will cause the threads on shaft 51 to move the block 157 along its rod until it finally comes into contact with the member 161, whereupon it will move the latter and its rod 159, to the right in Figs. 21 and 22. The sleeve 162 will carry the lever 163 around on its pivot until the pin 166 engages in a different recess 167. In this movement the arm of the lever 163, which engages with a pin on 172 on the switch arm will move the latter over to the left, so that contact point 169 will be thrown out of circuit, and contact points 170 and 171 will be connected. This will have the effect of energizing the magnets 134 and tripping the trigger 130. This will cause the tightening of the side tension devices to be terminated. This was accomplished because the action of the magnets in tripping the trigger 131 initiated the operation which advanced the cam 79 one step. A movement of the latter from one position to the other caused the throwing out of one of the clutches, i. e., the one which caused the tightening of the side tension devices; and permitted the throwing in of lever 102, and actuating lever 108, thereby disconnecting the switches and stopping the motor.

Whenever the direction of rotation of the shaft 51 is reversed, as when the side tension devices are being loosened, the block 157 will be caused to travel in a reverse direction to that first described, or to the left in Figs. 21 and 22. When it strikes the member 160, it will shift the rod 159 to the left and thus rock the lever 163 back to its previous position, that shown in Figs. 21 and 22. The shifting of the electrical contacts by the switch 172 will cause another movement of the cam 79, which will terminate the loosening of the side tension devices and initiate the operation of the next succeeding function.

From the above explanation it will be obvious that, as long as the contact members 161, 160 remain in the same relative positions the operations which cause the tightening of the side tension devices will always be of equal extent, and the loosening operation will always bring the parts back to the same position. Whenever the contact member 161 is adjusted along rod 159 the extent of the tightening operation will be either increased or decreased. This adjustment may be made to suit the particular character of the fabric. One object of this modifying arrangement is, that it serves to control two or more side tension devices, because it affects the shaft which is common to them.

The following device is adapted to modify or terminate the application of the operating force to the vertical tension device.

Reference may be here made to Figs. 24 to 28. The shaft 173 which is in line with the shaft 67, carries a yoke casting 174, which is slidable along the shaft 173; and it has at one end a circular plate 175. Secured to the shaft 173 within the yoke, there is shown a block 176 which carries spring pressed latch 177, which is movable into and out of engagement with the circular plate 175, the purpose of which is to lock the yoke against lengthwise movement on the shaft, until released. Between one end of the yoke and the block 176, and surrounding the shaft 173, there is a spiral spring 178, which must be compressed whenever the yoke is moved on the shaft toward the left in Figs. 24 and 25. One end of the yoke has an extension 130 which carries a roller 179 which is seated in a recess 180 in a flanged disk 181 on the shaft 67. The recess is slanting at one side only (see broken lines Fig. 24), in order that the roller may ride out of the recess in but one direction. There is a block 182 fixed on the shaft 173, and it carries a pin 183 which forms a fulcrum for a swinging latch 184. The latter is arranged to engage behind a projection 185 on the yoke, whenever the latter has been shifted along the shaft 173, as when the roller 179 rides out of its recess 180. A pin 186 on the block 182 engages in a slot 187 and limits the movement of the latch.

On the flanged disk 181 there is arranged a fiber disk 188 having slots 189ª into either of which a pin 189 of the latch 184 may enter. This disk is frictionally pressed against the inside of the disk 181 by a spring 190, so that the disk has a tendency to travel with the wheel but it may slip.

The shaft 173 carries a gear 192 that meshes with and operates a gear 193 arranged upon a shaft 194. This latter shaft is journaled in standards 195 on the bed; and it is provided with a threaded portion 196, on which is threaded a traveling trip-block 197. The latter straddles a bar 198, fixed to the standards 195, so that the block cannot revolve with the shaft, but must be moved along in one direction or the other, according to the direction the shaft revolves.

There is a bar 199 slidably arranged in the standards. It is provided with a fixed contact member 200, near one end, and with a threaded contact member 201 adjustable along the bar. The bar 199 has a fixed sleeve 202 which operates on one arm of a lever 203 to rock the latter upon its fulcrum 204. This arm of the lever is also in the path of the circular plate 175 of the yoke 174, so that the lever may be tripped in one direction by the movement of the yoke, and in either direction by the threaded traveling trip block 197 acting on the contact members 200 and 201 of the rod 199. One arm of the lever 203 engages a pin 205 on the lever of a two point switch 206, which is similar to the switch in Fig. 22. The lever is held by a spring pin 207 in either of its positions. There is a sleeve 210 slidable along the shaft 173 for tripping the latch 177. The sleeve is operated by means of a lever 208 fulcrumed at 209. One arm of this lever is in the path of the traveling trip block 197.

When the shaft 67 is revolved in the direction necessary to tighten the vertical tension, the operation will be as follows: At the beginning of the operations the movements will be positive, because the yoke cannot move along the shaft 173 on account of being held by the latch 177; and the roller 179 therefore cannot move out of the recess 180. The action of the shaft 67 in operating the shaft 173 is therefore positive at first. As the block 197 is moved to the left in Figs. 24 and 25 it will come into contact with one arm of the lever 208, and cause the latter to rock. The lever will force the sleeve 210 under the end of the latch 177, until the latter is disengaged from the plate 175, so that the yoke may move along the shaft 173. If, now or after this time, the vertical tension has been tightened to the desired degree the resistance thereby occasioned to the turning of the shaft 173 will cause the roller 179 to ride up the slanting side of the recess 180 and onto the perimeter of the flanged disk 181. The rising of the roller out of the recess forces the yoke along the shaft 173, against the resistance of the spring 178, which is compressed between the yoke and the block 176. As the yoke moves along, its circular plate 175 will rock the lever 203 and thus throw over the switch 206. In consequence thereof the magnets 134 will be energized, and, through the mechanism previously described, the cam 79 will be advanced one step, to cut off the vertical tensioning operation and to initiate the action of the next succeeding function. If sufficient resistance is not obtained to cause the roller 179 to ride up the slanting side of the recess within the limits of the mechanism, the tripping of the switch 206 to bring about the stoppage of shaft 173 will take place, nevertheless, by a safety device. That is to say, after the block 197 trips the lever 208 it will continue to travel along the rod 198 until it strikes the contact member 200 and forces over the rod 199. In this case the lever 203 will be rocked to throw the switch 206 over and close the contacts 211, 212. Whenever the roller 179 rides out of its recess and forces the yoke 174 along, there will be a relative movement between the shafts 67 and 173; which will cause the disk 188 to turn the latch 184 sufficiently to bring the front end of the latch behind the projection 185 of the yoke. From this time on this latch will hold the yoke back, with its spring under tension, so that the roller 179 can not fall back into its recess until the direction of the shaft 67 is reversed, as when the vertical tension is being loosened. When the shaft 67 is revolved in a reverse direction, to loosen the vertical tension, the disk 188 will trip the latch 184 from behind the projection 185, allowing the roller 179 to be pressed against the wheel until it is entered into the recess 180. The shaft 173 will then turn with the shaft 67; and the trip block 197 will travel to the right. When it passes out of engagement with the lever 208 the latch 177 will again engage the circular plate 175, holding the same until again released during the next tightening operation. When the trip block has traveled far enough to engage the contact member 201 it will shift the rod 199, throw the lever 203 and the switch 206 to bring the shaft 67 to a stop and to initiate the operation of the next function. As the contact member 201 is adjustable along the rod 199 it may be set to cause the termination of the vertical-tension releasing operation at any desired point. Or, considered in a different light, the contact 201 is adjustable so that the vertical tensioning may be continued any desired extent after the resistible means becomes effective.

From the above description it will be apparent that the tightening of the vertical tension is first positive, and that afterward the resistance of the tension produced will automatically control the application of the operating force and will automatically terminate it when the desired tension is reached. The object of this is not to have the operation dependent upon a friction drive, throughout, but only when the operation is nearly complete. It is to be noted that, regardless of the extent of this tightening operation, it is terminated and the next function initiated, as soon as it has reached the desired degree. There is no possibility of a succeeding function being initiated before the one operation is terminated, because the same step of the cam will discontinue the one and initiate the other.

The next branch of the mechanism to be described is that which determines the extent of the fabric shifting operation. This device is shown attached to the tambour frame, for simplicity, but it may be otherwise mounted, if desired.

There is a shaft 214 having one end arranged in a rocking journal 215, while its other end is guided in a bearing 215ª and on a bar or shaft 216. This bar or shaft 216 is operated with the vertical tension devices, and it serves to place the final vertical stress on the fabric, and to release it preceding the shifting operation. When this rod 216 rises, in the operation of placing the final stress upon the fabric, it raises one end of the shaft 214 upwardly; and, in lowering to release the fabric tension, it lowers the end of the shaft. This end of the shaft 214 carries a rough surface friction roller 217 which is thus moved out of and into contact with the fabric on one of the fabric rollers, 16, when the shaft is raised and lowered by the rod 216. This arrangement is a very convenient one. But it is to be understood that the shaft 214 may be raised and lowered by other means.

The shaft 214 with its roller 217 is held in contact with the fabric roller by a spring 218, so that the roller 217 may rise as the fabric roller increases in diameter by reason of the fabric being wound thereon. Since the roller 217 contacts with the periphery of the roll of fabric, it is operated in direct accordance with the extent of the fabric shifted; or, in other words, it measures the fabric shifted, instead of measuring the number of revolutions of the fabric roller.

The tambour frame carries a casting 219 in which the parts of the measuring device are mounted. There is a shaft 220 journaled in this casting, and it has a gear wheel 221, fixed thereto, which meshes with a gear 222 on the swinging shaft 214. Through these parts the shaft 220 is revolved according to the shifting of the fabric. A worm gear 224 arranged loosely on the shaft 220 meshes with a worm 223 on the shaft 8, which is the side-tension device shaft. There is an arm 225 carried by the hub of this worm gear.

On one end of the shaft 220 there is fixed a dial 226 having suitable markings indicating different adjustments which may be made. A tripping member 227 can be set to the markings on the dial to control the shifting of the desired amount of fabric. The tripping member 227, shown detached in Figs. 9 and 10, has a slot to receive the end of the shaft 220. Its upper end has downward directed teeth 228 to engage the teeth 229 arranged around the edge of the dial. This tripping member may be arranged with its teeth engaging the teeth on the dial, at any position around the latter, according to the extent of fabric to be shifted; and it is secured, when positioned, by a thumb nut 230 on the shaft 220. The tripping member is arranged to engage and trip a lever 231 which is held in its path by a spring 232; and the extent of the rotation of the shaft 220, which will take place before the lever 231 is tripped, will depend upon the position to which the member 227 is adjusted on the dial.

There is a lever 233, fulcrumed at 234, which is held in the position shown by the lever 231. A spring 235 connected with the lever 233 will throw it over when it is released by the action of the tripping member on the lever 231, and this lever controls the throwing of a switch 236.

A counterweighted lever 237 secured to the shaft 220 carries a lever 238, one end of which is arranged to engage in a recess 239 in a fixed plate 240, for the purpose of bringing the shaft 220 to a stop always at the same position, upon its return movement. The other arm of the lever 238 has a lateral projection 241 which is adapted to be engaged by a pin 242 on the arm 225, whenever the opposite end of the lever is out of the slot or recess 239, but which is otherwise free of the arm 225. The end of the lever 237 is adapted to engage the upper end of the switch-throwing lever 233 for the purpose of setting it back to the position shown in Fig. 7, after which it is itself held from rotation in one direction by a trip 243, which is fulcrumed on the same shaft as the switch lever 233. The trip 243 is moved into the path of the arm 237 by a spring 244. The trip 243 has a pin 245 arranged in the path of the end of the arm 225 so that the trip may be released thereby.

The fabric shifting, as previously explained, takes place after the side tension and vertical tension devices have been released, and previous to the time when these devices are again tightened. In the operation of loosening the side tension devices, the side tension shaft 8 operates, through the worm 223 and gear 224, to turn the arm 225 to the right in Figs. 6 and 7. At the end of this movement the arm 225 rests in the position where its end is under the pin 245 of the trip 243, so that arm 237 and shaft 220 may thereafter be operated to the right.

In the operation of releasing the fabric of the vertical stress, the rod 216 moves downwardly, allowing the end of the shaft 214 to be drawn downwardly by its spring 218 until the roller 217 contacts with the fabric-covered roller 16. The contact member 227 is assumed to have been previously adjusted on the dial according to the amount of fabric to be shifted.

The completion of the operation of releasing the fabric of the vertical tension, above described, initiates the operation of the fabric reeling. The fabric roller 16 during its rotation will act upon the roller 217; and this movement will be transmitted through gears 222 and 221 to the shaft 220. The lever arm 237, the dial plate and the tripping member 227 will revolve with the shaft 220 until the member 227 trips the lever 231 which holds the switch lever 233. The extent of movement of the shaft 220 which takes place before this tripping operation will depend upon the position of the member 227 on the dial. When the lever 231 is thus tripped the lever 233 will be thrown over by its spring 235; and this will throw the switch 236 and close the circuit which includes the magnets 134. This starts the mechanism previously described to rotate the cam 79 one step, which stops the fabric-shifting operation, and initiates the next function i. e., the tightening of the vertical tension.

From the above it will be apparent that the fabric shifting operation is automatically initiated, and is terminated automatically according to previous adjustment. It will also be apparent that the shifting will be according to the adjustment, regardless of the change of diameter or circumference of the roll of fabric on the fabric roller.

As the vertical tension is again applied, the rod 216 will be moved upwardly; and this will take the roller 217 off the fabric roller.

When the vertical tension operation has been completed, and the side tension device is being applied, the shaft 8 will operate through the worm 223 and gear 224 to rotate the arm 225 reversely to its previous movement, that is, to the left in Figs. 6 and 7. The pin 242 will engage the lateral projection 241 of the lower arm of lever 238, and it will carry the shaft 220, and all the members fixed thereon, back to the first or starting position; that is, the parts will be returned until the end 238' enters the slot or recess 239 in the fixed member 240, whereupon the movement will cease, because the projection 241 will escape from pin 242 leaving the parts as they were previous to the commencement of the fabric shifting operation. For as the end 238' enters the recess 239, the end 241 will move out sufficiently to allow the pin 242 on arm 225 to disengage therefrom, so that the latter may continue on to the end of its movement. As the end 238' enters the recess 239 the arm 225 passed the trip 243; and thereafter the end 238' in the recess 239 and the trip 243 against the arm 241 serve to lock the shaft 220, until a subsequent operation is initiated. Furthermore, as the end 238' enters its recess 239 the end of arm 237 acts on the switch lever 233 and pushes it into the position from which it started, (see Fig. 7). This movement threw the switch 236 to open circuit. The switch 236, therefore, closes the magnet circuit when the fabric is sufficiently shifted and the switch is reset to open the circuit when the shaft 220 is returned.

I will here describe the electric circuits by which the different operations of the fabric devices are controlled.

As previously described, the plate 150 has the contacts 144 to 149, inclusive, arranged around it, and also a contact 151 at its center. The ratchet wheel 140, as it is successively moved with the shaft 78 each time a change of function is initiated, advances the contact member 143 in such a manner that it first connects the contacts 151 and 144; then 151 and 145; and so on, until the contacts 151 and 144 are again connected at the completion of a revolution of the shaft 78 and its cam 79. The contacts 144 and 151 are connected by the contact member 143, while the mechanism is in the idle position preceding the commencement of the cycle of operations. If the switch 109 is closed, by throwing the hand lever 111, to start the motor 26 and the shaft 25, a circuit will also be completed as follows: From the battery 246, through wire 247, switch 109, around the coils of the magnets 134, through the contact 151, member 143, contact 144, wires 248 and 249, back to the battery. At this time there can be no other circuit because all other circuits are broken on the plate 150. This circuit energizes the magnets and causes the first step of the shaft 78, and cam 79. The movement of shaft 78 will carry the member 143 to contact 145, breaking the circuit just described. The first circuit initiated the loosening of the side tension devices, by the first step of cam 79 which acted on the corresponding clutch. The cam also locked the two switches 107 and 109. When the side tension devices are loosened, the switch 168 will be automatically thrown over to the contact point 169, as the first step of the cam shaft has connected the points 151 and 145 by means of the member 143. The circuit will now be closed and run from the battery through wire 247, switch 109, magnets 134, contact 151, the member 143, contact 145, the wire 250, the switch 168, wires 251, 248 and 249, back to the battery. At this time none of the other circuits can be closed, because they are all broken at the plate 150. The above circuit operates to shift the shaft 78 one step and bring the member 143 into contact with the point 146. This second step of shaft 78 stops the loosening of the side tension device and starts the loosening of the vertical tension by means of the corresponding clutches. When the latter operation is completed the switch 206 will be thrown over to engage the contact 213. A circuit is thus made as follows: From the battery to the contact 151; then through the member 143, contact 146, wire 252, wires 253, 248 and wire 249, back to the battery. No other circuit can be closed at this time.

The closing of the above circuit caused shaft 78 to advance another step, and this stopped the vertical-tension loosening operation and initiated the fabric shifting operation. When this latter operation is completed, the switch 236 will be thrown to contact with the point 253. This will close the circuit as follows: From the battery to the contact 151 as before; then through the member 143, contact 147, wire 254, switch 236, wire 255 and wire 249, back to the battery. No other circuit can be closed while the member 143 is contacting with the point 147, and therefore the movement of the shaft 78 can only be caused by the fabric-shifting device. The closing of the last mentioned circuit turned the shaft 78 another step, to stop the fabric shifting and to initiate the vertical-tension tightening operation. This brought the member 143 to contact with the point 148. As soon as the vertical tension tightening operation is completed the switch 206 is thrown from contact 213 (to which it was previously moved) over to contact 211.

A circuit will now be closed as follows: From the battery to the contact 151, as before; then through the member 143 to the contact 148, wire 256, switch 206, wires 253, 248 and wire 249, back to the battery. This is the only circuit which can be closed while the member 143 is in contact with the point 148.

The closing of the last mentioned circuit caused the rotation of shaft 78 another step, which stopped the vertical-tension tightening operation and initiated the tightening of the side tension devices. It also moved the member 143 over to the point 149.

When the side tension devices have been tightened, the switch 168 will be thrown from contact 169 (to which it had been thrown by the loosening operation) to contact 171, and a circuit will be thereby closed as follows: From the battery to the point 151 as before; then through the member 143, contact 149, wire 257, switch 168, wires 251, 248 and wire 249, back to the battery. At this time no other circuit can be closed.

The closing of the above circuit will advance the shaft 78 another step, and bring the member 143 to the point 144 again. The cam 79 on shaft 78 will release the lever 108, and thereby disconnect the two switches 107 and 109 and this will also bring the machine to a stop, since a complete cycle of operation has been completed.

From the above description of the circuits, when considered in connection with the mechanical operations, it will be apparent that the shifting of the contacts on the plate 150 advances the circuits, in connection with the mechanical operations, in such manner that the circuits must operate in proper sequence. That is to say, any given function of the mechanism can only be initiated by the completion of the function which properly and immediately precedes it. Therefore, no confusion in the several operations can arise, as the several functions must take place in their proper sequence. This is so, even though any of the several switches should be accidentally thrown by hand, or otherwise, out of their proper turn.

It may be desirable to modify the shifting of the fabric, as caused by the automatic mechanism, as when seams or defects occur in the material, or when the supply of fabric is first placed on the fabric rollers, or for other reasons. The device for accomplishing this is as follows: There is a hand lever 258 (see Figs. 2, 3 and 4) fulcrumed at 259 to a bracket on the bed; and it has a projection 260 which acts as a stop. A curved link 261, connected with this lever, slides on the bed; and it has a turned up end 262 arranged to engage a pin 263 on the lever 91 which controls the clutch 41 for operating to shift the fabric in the usual direction.

Adjacent to the lever 258 there is another hand lever 264, which is connected by the link 36 with the clutch 34 which controls the operation of the fabric shifting shaft in the direction reverse to the ordinary operation. That is, it controls the backward shifting of the fabric. The lever 258 has a curved plate 265 which is in the path of an arm 266 on the link 36.

If the fabric is to be shifted, that must, of course, be done while the vertical tension and side tension devices are disengaged; that is, when the shaft 78 is in position to make the fabric shifting device operative. If it is desired to control the shifting of the fabric manually, the lever 258 is turned down to the right; and this will cause the turned up end of the link 261 to engage the pin 263 on the lever 91 so that the roller on this lever can not enter the recess in cam 79. This will arrest the operation of the succeeding functions. The lever 264 controls the clutch 34, by which the backward shifting of the fabric is effected. This lever 264 may be freely turned down to cause the backward shifting of the fabric, while the lever 258 is turned down as just described. The arm 266 on the link 36 acting against the stop plate 265 permits the hand lever 264 to be manipulated only at the time the hand lever 258 is turned down, and, therefore, the reeling clutches can not both be thrown in at the same time.

If it is desired to shift the fabric forward, the hand lever 264 is placed in the position which will disengage the clutch 34. When this lever is so positioned, the pin 266 on the link 36 will then be out of the path of the stop plate 265; so that the lever 258 can be freely used to control the forward shifting of the fabric, and so that the cam 79 acting through lever 91, can throw the clutch 41 in or out.

It is to be understood that the electric circuit which connects with the switch 236 has been made inoperative by loosening the member 227 on the dial plate by unscrewing the wing nut 230.

When, following any of the above mentioned manipulations under the manually controlled means, it is desired to continue the movement of the mechanism to complete the subsequent operations in proper sequence, the lever 264 will first be rocked to the left in Fig. 3, to release the clutch 34, and then the trigger 131 will be tripped by hand to start the machine. When this has been done, the lever 258 is moved to the left in Fig. 3 to let the lever 91 swing back into engagement with the cam 79. From then on the machine will operate automatically to complete the remaining functions.

In order that the application of the lateral tension and vertical tension and the operation of the fabric rollers may be clearly understood, I will explain the illustrated means for these several operations, from the shafts 8, 9 and 10 onward.

The shaft 8 operates the side tension devices, being provided with worms 17, 17 actuating worm gears 18, 18 on shaft 19 carrying the pin rollers 152, the rotation of which in the direction of the inclination of the pins (see Fig. 29) stretches the fabric laterally. A jawed disk 267 is frictionally held between the worm gear 18 and a disk 268 pressed down by a spring 269 compressed below a collar 270 on the shaft 19. A pin 271 on the under side of the jawed arm of the disk 267 engages in the fork of an arm 272 carried by a shaft 273 the upper end of which shaft projects up between the jaws of the arm on the disk 267. A clockwise rotation of the shaft 19, to tension the fabric, will immediately at its commencement similarly rotate the disk 267, giving the shaft 273 an anti-clockwise movement, and causing it, through the crank arm 274 and link 275 pivoted to the arm 276 of the composite grip 277 pivoted at 278 and provided with the multiplicity of plates 153 causing independent pressure rollers 154 to close the composite grip against the fabric so as to coöperate with the roller 152 in tensioning the fabric. After the grip has been closed the worm gear 18 may continue to revolve, slipping against the disk 267, until the desired tension of the fabric has been obtained. When the shaft 19 is reversed, its initial movement will throw the disk 267 around and open the grip, as shown in Fig. 29, after which the continued rotation of the shaft 19 will entirely release the lateral tension of the fabric.

The shaft 9 operates the vertical tensioning devices, being provided with a worm 279, actuating a worm gear 280 carried by a bracket 281 and threaded upon the end of the bar 282, so that the bar 282 will be raised or lowered in accordance with the direction in which the shaft 9 is turned. This bar 282 is provided with upper roller engaging brackets 283, 283 secured thereto by suitable means, as set screws 284, 284 so as to permit of their preliminary vertical adjustment. A bar 285 extending across the tambour frame, has similar adjustable brackets 286, 286, with set screws 287, 287 for bracing the lower rollers. An arm 288 from the bar 285 serves as a guide to the lower end of the bar 282.

Preliminary adjustment of the roller engaging brackets having been made, tension may be applied by rotating the shaft 9 to raise the bar 282 and its brackets, the lower rollers being held down against the stress of the fabric by the brackets 286.

The shaft 10 operates the fabric rollers 16, 16 through worms 11, 11, and worm gears 12, 12, shafts 13, 13, worms 14, 14, and worm gears 15, 15, so that the rollers 16, 16, may be turned forward or backward, in accordance with the direction of rotation of the shaft 10, to feed the fabric forward or backward as desired.

Operation: This has been set forth to a great extent in the preceding description. During and after the stitching of a rapport row or rows of embroidery, the fabric will be under vertical and horizontal tension; and, if it is desired to present new portions of the fabric in position for stitching, the following operations will take place. If the member 227 is not in the desired position, it will be reset on the dial to control the shifting of the fabric the desired extent. The hand lever 111 will then be rocked to close the switch 107, and thus start the motor and the shaft 25. The lever 111 also closes the switch 109 and this operates to close a circuit including the coils of the magnets 134 and thus trip the trigger 131 from the arm 130. The latter will then fall, and its shaft 129 and the pawl 123 will move with it, until the pawl comes into operative relation with the swinging arm 118. The latter will carry the pawl and the roller 135 either to the right or left; and the roller will operate upon the cam 136 to rock the shaft 78 and advance the cam 79 one step. The pawl 123, the shaft 129 and arm 130 will all be returned to their first positions by the arm 126; and the trigger 131 will re-engage under the arm 130 when the circuit referred to is broken, as is the case when shaft 78 is advanced. The first step of the cam 79 advances the contact member 143 to the contact point 145, thus making it possible for the trigger 131 to be tripped by the side tension device. It also rocks the lever 102, to hold the switches 107 and 109 closed until the cycle of operations has been completed. It also permits the lever 82 to be drawn over by its spring; and this throws in the clutch 59 to start the loosening of the side tensioning devices. When the block 157 reaches the member 160 (which it will at the end of the loosening of the side tension devices), the rod 159 will be shifted and the switch 168 will be thrown over to make contact with the point 169. A circuit is now completed through the wire 250, contact 145, contact plate 143, wire 134ª, magnets 134, battery 246, and wires 249 and 251. The energizing of the magnets 134 by this operation trips the trigger 131; and, in the same manner as before the shaft 78 and cam 79 are advanced another step. This latter operation stops the backward movement of the side tension devices, by the cam 79 acting on the lever 82 to throw out the clutch 59. The cam 79 also releases the lever 87, and permits it to be drawn over by its operating spring, so that clutch 74 is thrown in. This will start the loosening of the vertical tension devices. When the block 197 reaches the member 201 (as it will do when the vertical tension devices have been sufficiently released), the rod 199 will be shifted to operate the switch 206 to make contact with the point 213. As the member 143 is now in contact with the point 146, a circuit will be closed as follows; through the wire 252, member 143, wire 134ª, magnets 134, switch 109, battery 246, wire 249, and wire 253. The magnets 134 will now trip the trigger 131 and cause the shaft 78 and cam 79 to be advanced one step. The contact 143 will also be advanced to the point 147. This movement of the cam will rock the lever 87 to throw out the clutch 74, and thus stop the backward operation of the vertical-tension devices. Both the side tension and vertical-tension devices have now been released, so that the fabric may be shifted. The last described movement of the cam 79, permitted the lever 91 to be rocked by its operating spring; to throw in the clutch 41. The fabric shifting device will now be operated to shift the fabric. During the loosening of the vertical-tension devices the roller 217 was placed in contact with the fabric on the roller 16. As the shifting of the fabric takes place, the roller 217, shaft 214, gears 222 and 221 operate to turn the shaft 220 and the dial 226. Previous to this, however, the loosening of the side tension devices operated through the worm 223 and worm gear 224 to revolve the arm 225 to the right hand in Fig. 6. During this movement of the arm it contacted with the pin 245 to trip the member 243 and release it from engagement with the lever 237. The latter, as well as the dial 226 and the shaft 220 were thereby placed in condition to be revolved. They will, therefore, be turned by the action of the roller 217 which is in contact with the moving fabric and operating through the gears 222 and 221. When the dial and the tripping member 227 have been revolved the desired extent (and the fabric has been correspondingly shifted), the member 227 will trip the trigger 231 and thus release the lever 233. The latter will now be drawn over by its operating spring and it will throw the switch 236 over to the contact point 253. This last operation will complete a circuit as follows; through the wire 254, contact 147, member 143, wire 134ª, magnets 134, switch 109, wire 247, battery 246 and wires 249 and 255. The energizing of the magnets 134 will cause the shaft 78 and cam 79 to be advanced one step, through the same devices as in the previous operations of the cam. This movement of the cam 79 will rock the lever 91 to throw out the clutch 41, and thus stop the fabric shifting operation. The cam 79 will also, in this movement, allow the lever 94 to be rocked by its operating spring to throw in the clutch 70. During the above operation of the cam the previously described pawl and ratchet device 138, 140 advanced the contact member 143 to the point 148. The throwing in of the clutch 70 initiates the forward operation of the vertical tension devices to place the fabric again under tension. The first part of this movement will be by positive drive, through the parts shown in Figs. 24 to 28. When the block 197 is moved sufficiently to the left it will engage the lever 208 and rock it sufficiently to shift the sleeve 210 and trip the catch 177. From now on the drive is subject to the condition of the fabric; that is, when the desired tension has been reached the resistance to the operation of the shaft 21 will cause the roller 179 to ride out of the inclined recess 180 in opposition to the spring 178. This will cause the yoke 174 to slide until the plate 175 strikes the lever 203 and rocks it sufficiently to throw the switch 206 over to contact 211. During the tightening of the vertical tensioning devices the roller 217 is moved so as to disengage it from the fabric, for its only function is to control the forward or measuring movement of the fabric shifting device, and it should be out of engagement except when the fabric is being fed forward. When the switch 206 is thrown over to contact 211, as above described, a circuit is closed as follows: Through the wire 256, contact 148, member 143, wire 134ª, magnets 134, switch 109, wire 247, battery 246, wire 249 and wire 253. This energizes the magnets and causes the trigger 131 to be tripped. This causes the cam 79 to be advanced as before, and the member 143 to be advanced to contact 149. The movement of the cam 79, in the last operation, rocked the lever 94 to throw out the clutch 70 and thus terminate the operation of the vertical tensioning devices. This movement of the cam also permitted the lever 99 to be rocked by its operating spring to throw in the clutch 54. The side-tension devices are now operated in the direction necessary to tighten the fabric. When the block 157 reaches the member 161 it will shift the rod 159, rock the lever 163, and throw the switch 168 over to contact 171. A circuit is thus made as follows: Through wire 257, contact 149, member 143, wire 134ª magnets 134, switch 109, wire 247, battery 246, wire 249, and wire 251. This operation energizes the magnets 134 which trip the trigger 131; and this advances the cam 79 the next and final step. This movement of the cam rocks the lever 99 to throw out the clutch 54 and thus stop the operation of the side tension devices. The cam will also permit the lever 102 to be rocked by its operating spring. This moves up the arm 108 which carries the knives of both switches 107 and 109. The motor circuit as well as the circuit through the magnets 134 is thus opened, and the machine is brought to a stop. During the last movement of cam 79 the member 143 is advanced to the point 144. A complete cycle of operation has now been completed; the fabric has been loosened, shifted and tightened. The same operations may be repeated in the same manner at pleasure.

If it is desired to modify or reverse the shifting operation, this is accomplished by using the hand levers 258, 264, in the manner previously described, between the loosening and tightening operations.

Having described my invention, what I claim is:

1. An embroidering machine having a tambour frame and means for supporting the fabric thereon, and fabric tensioning mechanism, comprising devices for performing different functions in the tensioning of the fabric, operating means for operating the several devices, and means actuated by a tensioning device for initiating the operation of another of said devices, whereby said devices will automatically operate in sequence.

2. An embroidering machine having a tambour frame and fabric supporting means, fabric controlling mechanism, comprising devices for performing different functions in the shifting and tensioning of the fabric, operating means for operating the several devices, and means actuated by one of said devices for initiating the operation of another of said devices, whereby said devices will automatically operate in sequence.

3. An embroidering machine having a tambour frame and means for supporting the fabric thereon, and fabric tensioning mechanism, comprising devices for performing different functions in the tensioning of the fabric, operating means for operating the several devices, and means, actuated by a tensioning device upon the completion of its operation, for initiating the operation of another of said devices, whereby said devices will automatically initiate the operation of each other.

4. An embroidering machine having a tambour frame for supporting the fabric, and fabric tensioning mechanism, comprising devices for performing different functions in the tensioning of the fabric, a common shaft from which said several devices are operated, and means actuated by said devices for initiating the operation of each other, whereby said devices will automatically initiate the operation of each other by said shaft.

5. An embroidering machine having a tambour frame for supporting the fabric, fabric tensioning mechanism and means for operating the same, including a plurality of relatively movable and separate gears, a common gear adapted to be operated by either of said separate gears for the purpose of operating the tensioning mechanism forwardly or backwardly, and automatic means for causing said common gear to be operated by either of said separate gears.

6. An embroidering machine having a tambour frame for supporting the fabric, fabric tensioning mechanism, including devices for performing different functions in the tensioning of the fabric, and means for operating the same, including a pair of gears for each of said devices, gears with each of which one of said pairs of gears continually mesh, clutch devices for throwing either gear of said pairs of gears into operation to cause said devices to operate forwardly or backwardly, and means for actuating said clutch devices.

7. An embroidering machine having a tambour frame for supporting the fabric, fabric tensioning mechanism, including devices for performing different functions in the tensioning of the fabric, means for operating the same, including a plurality of gears for operating a common gear, and continuously in mesh therewith, means initiated by a fabric tensioning device for causing said latter gear to be operated by either of said first gears, to cause another of said tensioning devices to be operated forwardly or backwardly.

8. An embroidering machine having a tambour frame for supporting the fabric, fabric tensioning mechanism, including devices for performing different functions in the tensioning of the fabric and operable forwardly and backwardly, operating means for operating the several devices, and means actuated by a tensioning device upon the termination of its forward movement for initiating the forward operation of another of said tensioning devices and actuated upon the termination of the backward movement of a tension device for initiating the backward movement of another of the tensioning devices.

9. An embroidering machine having a tambour frame for supporting the fabric, fabric tensioning mechanism, including devices for performing different functions in the tensioning of the fabric, means for operating the same forwardly and backwardly, including a plurality of gears operating a common gear and continuously in mesh therewith, means initiated by one of said fabric devices upon the termination of its backward operation for causing said latter gear to be operated by one of said first gears, to cause the backward operation of another of said fabric tension devices, and actuated upon the termination of the forward operation of a tensioning device to cause said second mentioned gear to be operated by the other of said first mentioned gears, to cause the forward operation of a tensioning device.

10. An embroidering machine having a tambour frame for supporting the fabric, fabric tensioning devices, a fabric shifting device, and operating means therefor, means actuated by a tensioning device for initiating the operation of the fabric shifting device, and means actuated by the fabric shifting device for initiating a fabric tensioning device.

11. An embroidering machine, having a tambour frame for supporting the fabric, tensioning devices for performing different functions in the tensioning of the fabric, operable forwardly and backwardly, fabric shifting means, means actuated by one tensioning device for initiating the operation of another tensioning device, means actuated by a tensioning device for initiating the operation of the fabric shifting device, and means actuated by the shifting device for initiating the reverse operation of the tensioning devices.

12. An embroidering machine having a tambour frame for supporting the fabric, a side tension device, a vertical tension device, a fabric shifting device, means actuated by the side tension device for initiating the vertical tension device, means actuated by the vertical tension device for initiating the fabric shifting device, means actuated by the fabric shifting device for initiating the vertical tension device, and means actuated by the vertical tension device for initiating the side tension device.

13. An embroidering machine having a tambour frame for supporting the fabric, a side tension device, a vertical tension device, a fabric shifting device, means actuated by the side tension device for initiating the vertical tension device, means actuated by the vertical tension device for initiating the fabric shifting device, means actuated by the fabric shifting device for initiating the vertical tension device, and means actuated by the vertical tension device for initiating the side tension device, and means actuated by the side tension device for terminating the operations.

14. An embroidering machine having a tambour frame for supporting a fabric, a side tension device, a vertical tension device, a fabric shifting device, means actuated by the releasing of the side tension device for initiating the releasing of the vertical tension device, means actuated by the releasing of the vertical tension device for initiating the shifting device, means actuated by the shifting device for initiating the tightening of the vertical tension device, and means operated by the tightening of the vertical tension device for initiating the tightening of the side tension device.

15. An embroidering machine having a tambour frame for supporting the fabric, fabric tensioning mechanism, embodying devices for performing different functions in the tensioning of the fabric, and means actuated by a fabric tensioning device for terminating its own operation and initiating the operation of another tensioning device.

16. An embroidering machine having a tambour frame for supporting the fabric, fabric tensioning devices, a fabric shifting device, means actuated by a tensioning device for terminating its own operation and initiating the operation of the fabric shifting device, and means actuated by the fabric shifting device for terminating its own operation and for initiating the operation of a fabric tensioning device.

17. An embroidering machine having a tambour frame for supporting the fabric, a fabric tensioning device, operating means therefor, means whereby the tension of the fabric will terminate the operation of the tensioning device, a second fabric tensioning device, and means actuated by said first tensioning device for initiating the said second mentioned tensioning device.

18. An embroidering machine having a tambour frame for supporting the fabric, a fabric tensioning device operable varying extents, a second fabric tensioning device, and means actuated by said first mentioned tensioning device at the completion of its operation, to whatever extent, for initiating the operation of the second mentioned tensioning device.

19. An embroidering machine having a tambour frame for supporting the fabric, fabric shifting means operable varying extents, fabric tensioning means, and means actuated by the fabric shifting means at the completion of its operation, to whatever extent, for initiating the operation of the fabric tensioning means.

20. An embroidering machine having a tambour frame for supporting the fabric, fabric tensioning means operable varying extents, fabric shifting means operable varying extents, means actuated by the fabric tensioning means at the termination of its operations, to whatever extent, for initiating the fabric shifting means, and means actuated at the termination of the fabric shifting means, to whatever extent, for initiating the reversal of the operation of the fabric tensioning means.

21. An embroidering machine having a tambour frame for supporting the fabric, fabric tensioning means, means for operating the tensioning means positively a definite extent and then resistibly, and means, controlled by the tension of the fabric, for terminating the operation of the tensioning means after it has been positively operated.

22. An embroidering machine having a tambour frame for supporting the fabric, fabric tensioning means, means for operating the tensioning means, adjustable means for causing the tensioning means to be positively operated definite extents, and means controlled by the tension of the fabric for terminating the operation of the tensioning means following the positive operation thereof.

23. An embroidering machine having a tambour frame for supporting the fabric, fabric tensioning means, means for operating the tensioning means positively a definite extent, means controlled by the tension of the fabric for terminating the operation of the tensioning means following its positive operation, other fabric tensioning means, and means actuated by said first tensioning means at the completion of its operation to whatever extent for initiating the said second mentioned tensioning means.

24. An embroidering machine having a tambour frame for supporting the fabric, fabric tensioning means, operating means therefor, means controlled by the tension of the fabric for terminating the operation of the tensioning means, other tensioning means, and means actuated by said first tensioning means at the completion of its operation for initiating said second mentioned tensioning means.

25. An embroidering machine having a tambour frame for supporting fabric, tensioning mechanism, embodying devices for performing different functions in the tensioning of the fabric, means actuated by the tensioning devices for initiating the operation of each other, and automatic means for putting the tensioning devices in condition to be successively initiated.

26. An embroidering machine having a tambour frame for supporting the fabric, fabric tensioning mechanism, embodying devices for performing different functions in the tensioning of the fabric, a fabric shifting device, means actuated by the tensioning and shifting devices for initiating the operation of each other, and automatic means for putting the tensioning and shifting devices in condition to be successively initiated.

27. An embroidering machine having a tambour frame for supporting the fabric, fabric tensioning mechanism, embodying devices for performing different functions in the tensioning of the fabric, and operable varying extents, a fabric shifting device operable varying extents, means actuated by the tensioning and shifting devices for initiating the operation of each other, and automatic means for putting the tensioning and shifting devices in condition to be successively initiated.

28. An embroidering machine having a tambour frame for supporting the fabric, tensioning mechanism, embodying devices for performing different functions in the tensioning of the fabric, means for adjusting the extent of operation of a tensioning device, and means actuated by the completion of the operation of said latter tensioning device for initiating the operation of another tensioning device.

29. An embroidering machine having a tambour frame for supporting the fabric, fabric tensioning devices, a fabric shifting device, means whereby said shifting device may be adjusted to operate varying extents, and means actuated by the shifting device at the completion of its operation, to whatever extent, for initiating a tensioning device.

30. An embroidering machine having a tambour frame for supporting the fabric, tensioning devices, a fabric shifting means, means actuated automatically by the shifting means for initiating a tensioning device, and manually controlled means for arresting said initiating means and for modifying the operation of the shifting means.

31. An embroidering machine having a tambour frame for supporting the fabric, tensioning mechanism, embodying devices for performing different functions in the tensioning of the fabric, operable forwardly and backwardly, reversing devices therefor, a common cam for operating the reversing devices, and means actuated by the tensioning devices for causing a step by step movement of said cam whereby said tensioning devices will be operated in sequence.

32. An embroidering machine having a tambour frame for supporting the fabric, tensioning mechanism, embodying devices for performing different functions in the tensioning of the fabric, operable forwardly and backwardly, operating means therefor, including gears and reversing clutches, a common cam and members successively operated thereby for controlling the clutches to cause the tensioning devices to operate forwardly and backwardly and in sequence, and means actuated by the several tensioning devices for causing a step by step movement of said cam, whereby said tensioning devices will be operated in sequence.

33. An embroidering machine having a tambour frame for supporting the fabric, tensioning mechanism, embodying devices for performing different functions in the tensioning of the fabric, operable forwardly and backwardly, means for putting said tensioning devices in condition to be successively initiated, reversing devices for the tensioning devices, a cam for operating the reversing devices, and means actuated by the different tensioning devices for causing a step by step movement of the cam whereby the tensioning devices will be operated in sequence, and for operating the means for putting said tensioning devices into condition to be successively initiated.

34. An embroidering machine having a tambour frame for supporting the fabric, devices for performing different functions in the tensioning of the fabric and means including electric circuits operable by the tensioning devices for initiating the operation of each other, and switches operated by the tensioning devices for controlling said circuits.

35. An embroidering machine having a tambour frame for supporting the fabric, devices for performing different functions in the tensioning of the fabric, means, including electric circuits operable by the tensioning devices for initiating the operation of each other, switches operated by the tensioning devices for controlling said circuits, and automatic means for rendering said circuits successively operable.

36. An embroidering machine having a tambour frame for supporting the fabric, devices for performing different functions in the tensioning of the fabric, operating means for operating a tensioning device a definite extent, means controlled by the tension of the fabric for terminating the action of the operating means upon a tensioning device, and means actuated upon the termination of the operation of said last tensioning device for initiating another tensioning device.

37. An embroidering machine having a tambour frame for supporting the fabric, fabric tensioning means, operating means therefor, adjustable means for causing the tensioning means to be positively operated a definite and adjustable extent, other tensioning means, and means actuated by said first tensioning means for initiating the operation of said second mentioned tensioning means.

38. An embroidering machine having a tambour frame for supporting the fabric, fabric tensioning means, operating means therefor, means for causing the tensioning means to be first positively operated a definite extent, and means for causing the tensioning means to be resistibly operated, whereby the tension of the fabric may terminate the operation of the tensioning device.

39. An embroidering machine having a tambour frame for supporting the fabric, fabric tensioning means, operable forwardly and backwardly, operating means therefor, means for causing the tensioning means to be positively operated a definite extent, means controlled by the tension of the fabric for causing the tensioning means to operate variable extents and means for causing said positive means to operate forwardly and backwardly.

40. An embroidering machine having a tambour frame for supporting the fabric, a tensioning device and means for operating it, including a recessed operating member, a member operated thereby and projecting into said recess, and resistible means for retaining the operated member in engagement with the recessed member, whereby the tension of the fabric will cause the operated member to disengage from the recess and terminate the operation of the tensioning device.

41. An embroidering machine having a tambour frame for supporting the fabric, a fabric tensioning device and means for operating the same, including a revoluble member having a recess, a coöperating member having means projecting into the recess, whereby said members will be operated together, a spring for resistibly retaining said members engaged, and adapted to be actuated by the tension of the fabric, a second tension device, and means actuated upon the disengagement of said coöperating member from the recess of said recessed member to initiate said second mentioned tensioning device.

42. An embroidering machine having a tambour frame for supporting the fabric, fabric shifting means and means for automatically controlling the extent of the shifting operation, comprising means engaging the fabric and actuated according to the extent of movement of the fabric.

43. An embroidering machine having a tambour frame for supporting the fabric, fabric shifting means including a fabric roller, and means for automatically controlling the extent of the shifting operation, including a roller engaging the fabric on the fabric roller and operated according to the extent of movement of the fabric.

44. An embroidering machine having a tambour frame for supporting the fabric, fabric shifting means and fabric tensioning devices, means for automatically controlling the extent of the shifting operation, including means for engaging the fabric and operated according to the extent of its movement, means operated by a tensioning device for throwing said latter means into operative relation with the fabric preceding the shifting operation, and for throwing it out of operation following the shifting operation, and automatic means for initiating the operation of the shifting and tensioning devices in sequence.

45. An embroidering machine having a tambour frame, fabric-shifting means, and fabric-controlled means, for arresting the fabric-shifting means.

46. An embroidering machine having a tambour frame, fabric-shifting means and fabric-controlled means for automatically arresting the fabric-shifting means after a predetermined movement of the fabric.

47. An embroidering machine having a tambour frame, fabric-shifting means, tension means and fabric-controlled means for automatically initiating the operation of the tension means.

48. An embroidering machine having a tambour frame, fabric-shifting means, lateral-tension mechanism and vertical tension mechanism and means operated by said mechanisms for initiating each other to automatically untension, shift and retension the fabric.

49. An embroidering machine having a tambour frame, fabric tensioning mechanism, comprising devices for performing different functions in the tensioning of the fabric, a common means by which said several devices are operated, and means actuated by said devices for initiating the operation of each other.

50. An embroidering machine having a tambour frame, reversible tensioning mechanism embodying devices for performing different functions in the tensioning of the fabric, actuating and reversing devices, common means for controlling the reversing devices, and means, actuated by said tensioning devices for automatically moving said common means into successive positions to control said actuating and reversing devices.

51. An embroidering machine having a tambour frame, a tensioning device and means for actuating it, including an operating element and an element in yieldable connection therewith and disconnectible therefrom by the stress of the fabric whereby the disconnection of the operating element will cause the operating element to cease exerting its operating force upon the tensioning device.

52. An embroidering machine having a tambour frame, fabric shifting means, vertical tensioning means, fabric measuring means, and means for causing the release and application of the vertical tension to respectively apply the fabric measuring means to and remove it from the fabric.

53. An embroidering machine having a tambour frame, fabric shifting means, tensioning means, fabric measuring means controlling the starting of the tensioning means, said measuring and tensioning means being interrelated so that the said measuring means is applied to the fabric by the release of the tensioning means and is released from the fabric by the tightening of the tension means.

Signed at the city, county, and State of New York, this 6th day of January, 1914.

JOSEPH A. GROEBLI.

Witnesses:
HENRIETTA A. BLUEFELD,
CHARLES G. HENSLEY.